(12) United States Patent
Tenzer et al.

(10) Patent No.: US 12,287,213 B1
(45) Date of Patent: Apr. 29, 2025

(54) GENERATING TRAJECTORIES FROM IMPLICIT NEURAL MODELS

(71) Applicant: Novateur Research Solutions, Ashburn, VA (US)

(72) Inventors: Mark Tenzer, Ashburn, VA (US); Emmanuel Tung, Ashburn, VA (US); Khurram Hassan-Shafique, Ashburn, VA (US); Zeeshan Rasheed, Ashburn, VA (US)

(73) Assignee: Novateur Research Solutions, Ashburn, VA (US)

( * ) Notice: Subject to any disclaimer, the term of this patent is extended or adjusted under 35 U.S.C. 154(b) by 0 days.

(21) Appl. No.: 18/920,980

(22) Filed: Oct. 20, 2024

Related U.S. Application Data

(63) Continuation of application No. 18/532,557, filed on Dec. 7, 2023, now Pat. No. 12,152,889.

(51) Int. Cl.
*G01C 21/34* (2006.01)
*G06N 3/08* (2023.01)

(52) U.S. Cl.
CPC ..... *G01C 21/3446* (2013.01); *G01C 21/3492* (2013.01); *G06N 3/08* (2013.01)

(58) Field of Classification Search
USPC .................................................. 701/400–533
See application file for complete search history.

(56) References Cited

U.S. PATENT DOCUMENTS

| | | | | |
|---|---|---|---|---|
| 10,839,467 B2* | 11/2020 | Ghaddar | ............ | G01C 21/3484 |
| 11,181,926 B2* | 11/2021 | Shalev-Shwartz | ..... | G06V 20/56 |
| 11,566,906 B2* | 1/2023 | Mubarek | ................ | G01C 21/32 |
| 11,961,155 B2* | 4/2024 | Cella | ................... | G01C 21/3469 |
| 2018/0276485 A1* | 9/2018 | Heck | ......................... | G06N 7/01 |
| 2019/0102840 A1* | 4/2019 | Perl | .......................... | G06N 3/08 |
| 2019/0226862 A1* | 7/2019 | Shaukat | ................. | G07C 5/008 |
| 2021/0063200 A1* | 3/2021 | Kroepfl | ............... | C03C 17/3644 |
| 2021/0374502 A1* | 12/2021 | Roth | ........................ | G06N 3/08 |
| 2022/0018674 A1* | 1/2022 | Xu | ................... | G06Q 10/08355 |

(Continued)

FOREIGN PATENT DOCUMENTS

WO  WO-2009105289 A2 *  8/2009  ......... G01C 21/3461

*Primary Examiner* — Jonathan L Sample
(74) *Attorney, Agent, or Firm* — Rahman LLC

(57) ABSTRACT

Generating trajectories from an implicit neural representation (INR) model to predict human mobility in uncertain traffic conditions includes receiving geocoordinate data representing vehicle motion observations of a traffic pattern; receiving a road network based on the geocoordinate data; training the INR model to learn continuous, latent fields of stochastic traffic properties over space and time based on the geocoordinate data; utilizing the INR model to extract spatio-temporal speed distributions from the geocoordinate data; applying a near-shortest-path, heuristic algorithm, weighted by predictions of the INR model, to produce real-world routing choices for traversing the road network; generating trajectories for transportation between an origin and destination in the road network using the algorithm and the predictions of the INR model, wherein the trajectories reflect non-deterministic and diverse route choices in the road network; and outputting generated trajectories to improve routing choices for a GPS and to provide the route choices for selection.

21 Claims, 14 Drawing Sheets

(56) References Cited

U.S. PATENT DOCUMENTS

| | | | | |
|---|---|---|---|---|
| 2022/0126864 | A1* | 4/2022 | Moustafa | H04W 4/46 |
| 2022/0187841 | A1* | 6/2022 | Ebrahimi Afrouzi | G05D 1/0274 |
| 2022/0319312 | A1* | 10/2022 | Mintz | G06Q 30/0224 |
| 2022/0375340 | A1* | 11/2022 | Pittman | G06N 20/00 |
| 2023/0067108 | A1* | 3/2023 | Dixit J | G06Q 10/06315 |
| 2023/0259870 | A1* | 8/2023 | Manohar | G06Q 10/0838 705/334 |
| 2023/0408277 | A1* | 12/2023 | Lu | G01C 21/3614 |
| 2024/0046066 | A1* | 2/2024 | Halilaj | G06N 3/09 |
| 2024/0143999 | A1* | 5/2024 | Deng | G06N 3/0442 |
| 2024/0308506 | A1* | 9/2024 | Quirynen | B60W 30/14 |

\* cited by examiner

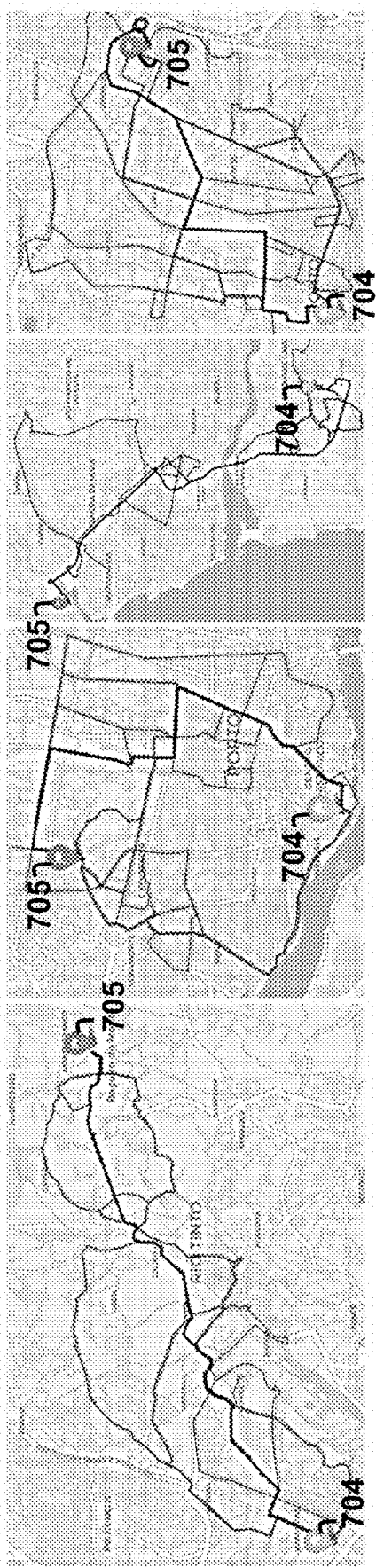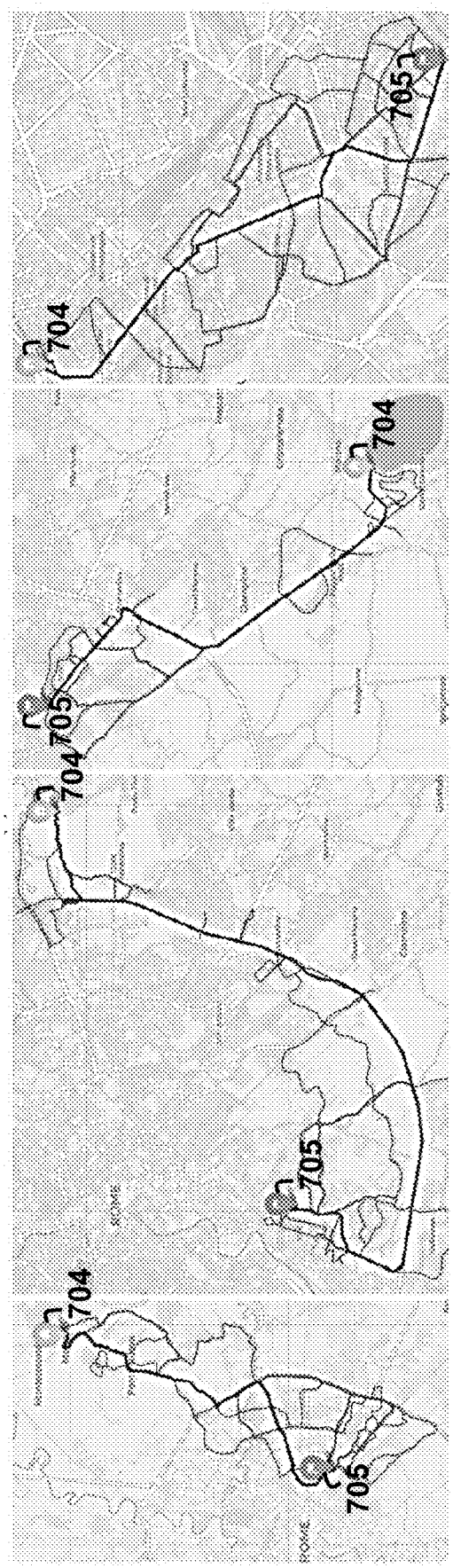
FIG. 7A
FIG. 7B

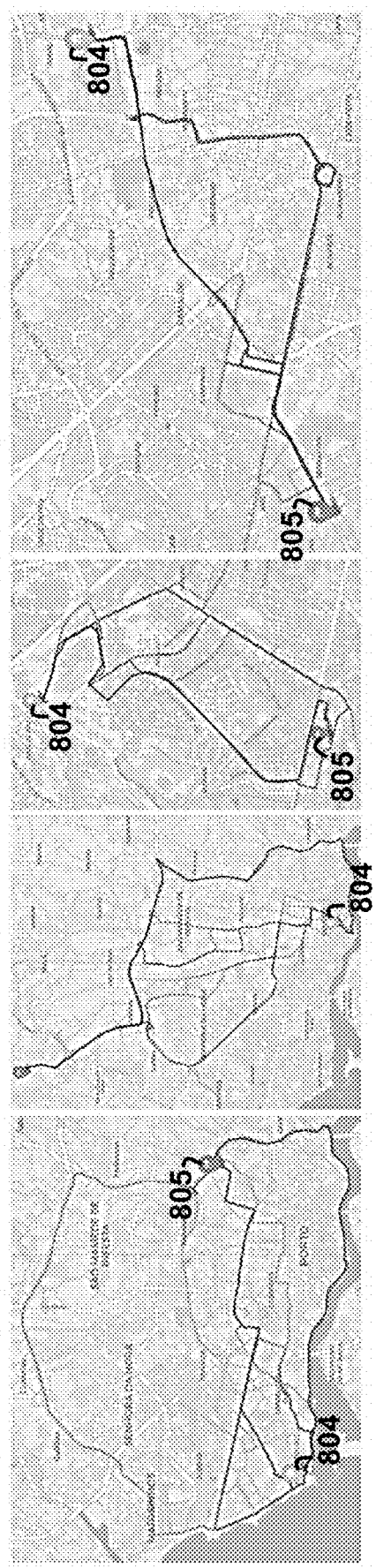

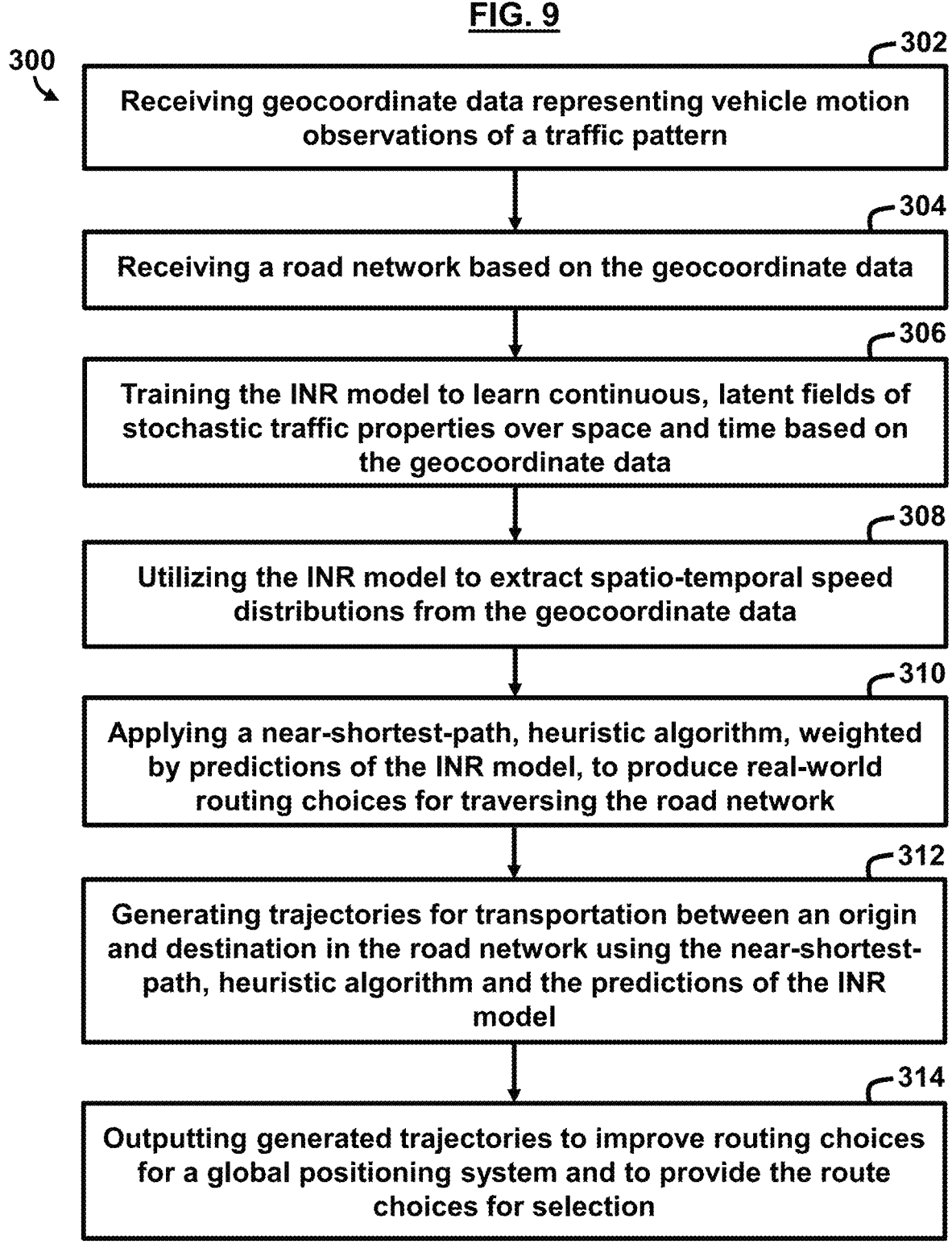

GENERATING TRAJECTORIES FROM IMPLICIT NEURAL MODELS

CROSS-REFERENCE TO RELATED APPLICATION(S)

This application is a continuation of U.S. patent application Ser. No. 18/532,557 filed on Dec. 7, 2023, which is incorporated herein by reference in its entirety.

GOVERNMENT INTEREST

Aspects of the invention described herein were developed through support under National Geospatial-Intelligence Agency (NGA) contract no. HM0476-21-C-0041. The U.S. government may have certain rights in this invention.

BACKGROUND

Technical Field

The embodiments herein generally relate to computer modeling, and more particularly to computer neural models used to understand, analyze, and simulate human mobility and traffic.

Description of the Related Art

This background description includes information that may be useful in understanding the present invention. It is not an admission that any of the information provided herein is prior art or relevant to the presently claimed invention or that any publication specifically or implicitly referenced is prior art.

Characterizing, describing, and understanding human mobility has motivated researchers for more than a century, and for good reason: movement patterns and their implications are vitally important to a range of stakeholders in transportation management, urban planning, disaster readiness and response, migration analysis, epidemic modeling, market research, business intelligence, and more. In recent years, the research field has been transformed by simultaneous and rapid growths in data availability and computational power. Today, the proliferation of GPS, Wi-Fi®, Bluetooth®, and other mobile positioning systems enables two research approaches capable of synthesizing entirely new, realistic data within a given area of interest or population: data-driven generative deep learning and large-scale, mechanistic simulation.

In the domain of human mobility, synthesizing trajectories with deep learning often combines elements of generative adversarial networks (GANs) and/or reinforcement learning. Sometimes, the two methods are combined in approaches inspired by SeqGAN or generative adversarial imitation learning. Variational autoencoders (VAEs) may also be used instead of GANs. These methods require collecting and storing large, long-term repositories of real-world mobility trajectories as training data, precluding mobility sensors with opportunistic, intermittent observations and also implying significant privacy concerns. As a result, taxicab datasets (e.g., Porto, San Francisco, Rome, Beijing) remain a popular choice; by tracking a taxi driver over time, the anonymity of the individual passengers is somewhat protected. However, these datasets remain expensive to collect and often have a relatively short time duration. They also may not be representative of the city's overall population, e.g., by over-representing tourists or residents with higher income.

An alternative approach produces an entirely synthetic population with realistic parameters and behavior, then records its location traces over time. These models share a closer history with classical transportation research than GAN, VAE, or other purely data-driven deep learning innovations. Influential activity-based model (ABM) frameworks such as TRANSIMS and its successors simulate these synthetic agents and emergent behaviors from their mutual interactions, which can be calibrated based on census, land-use, point-of-interest (POI), or similar data. Recent research with these tools has successfully generated millions of simulated agents and their mobility. Though these simulation models can also use real mobility data for calibration, in general they do not require as much fine-grained location data as GAN, VAE, or other deep learning approaches, resolving the former's privacy concerns. In exchange, however, ABMs do not necessarily capture location-specific patterns that could only be extracted from that data. For example, ABMs often assume that individuals will choose the shortest (least time) route to their destination; in real data, this occurs roughly 30 to 45 percent of the time. If excluding short paths with no feasible alternatives, the proportion is far lower. Individuals may instead choose paths based on safety or personal risk, aesthetics, or any number of other unanticipated factors. At a minimum, random stochastic choices underlie each real-world individual's route preferences, in a manner difficult to learn except from data.

SUMMARY

In view of the foregoing, an embodiment herein provides a computer-readable medium storing instructions for generating trajectories from an implicit neural representation (INR) model to predict human mobility in uncertain traffic conditions, the instructions comprising receiving geocoordinate data representing vehicle motion observations of a traffic pattern; receiving a road network based on the geocoordinate data; training the INR model to learn continuous, latent fields of stochastic traffic properties over space and time based on the geocoordinate data; utilizing the INR model to extract spatio-temporal speed distributions from the geocoordinate data; applying a near-shortest-path, heuristic algorithm, weighted by predictions of the INR model, to produce real-world routing choices for traversing the road network; generating trajectories for transportation between an origin and destination in the road network using the near-shortest-path, heuristic algorithm and the predictions of the INR model, wherein the trajectories reflect non-deterministic and diverse route choices in the road network; and outputting generated trajectories to improve routing choices for a global positioning system (GPS) and to provide the route choices for selection.

The instructions may comprise comparing real-world trajectories to the generated trajectories to identify deviations indicative of potential anomalies in real-world transportation behavior. The instructions may comprise receiving the geocoordinate data representing an origin location and a destination location within the road network. The instructions may comprise training the INR model to predict parameters of a Gaussian mixture probability density for vehicle speed in the traffic pattern, and wherein the parameters comprise means and standard deviations for the Gaussian mixture probability density. The instructions may comprise using the INR model to predict speed distribution parameters for various locations, times, road types, and directions of travel within the road network. The instructions may comprise constructing a line digraph of the road network, and wherein edges of the line digraph correspond to possible turns or transitions between road segments in the road network.

The instructions may comprise executing the near-shortest-path, heuristic algorithm to find diverse near-shortest paths from the origin location to the destination location within the line digraph, wherein the near-shortest-path, heuristic algorithm considers costs of paths and pruning paths exceeding a predetermined cost threshold, and wherein the costs comprise a time expected to traverse a road segment. The instructions may comprise generating the trajectories by mapping the diverse near-shortest paths to corresponding speed distributions predicted by the INR model for respective locations and times within the road network. The instructions may comprise inputting parameters into the INR model, and wherein the parameters comprise a geocoordinate position in the road network, a time of day, a type of road in the road network, and a direction of travel in the road network. The instructions may comprise outputting the generated trajectories to a display screen to provide the route choices for selection.

The instructions may comprise generating the trajectories by adapting to real-time traffic conditions in the road network. The instructions may comprise providing alternate routes based on the real-time traffic conditions. The instructions may comprise characterizing the road network as a weighted graph comprising a geocoordinate, a road segment in the road network, a set of turn angles in the road network. The instructions may comprise characterizing the set of turn angles as unrestricted turns and restricted turns in the road network. The instructions may comprise characterizing the set of turn angles as time delays in traversing the road network. The instructions may comprise training the INR model to predict speed distributions of the traffic patterns in the road network based on historical traffic data. The instructions may comprise training the INR model to predict speed distributions of the traffic patterns in the road network based on real-time traffic data. The instructions may comprise receiving the geocoordinate data of fragments of vehicle motion observations of a spatially-continuous and temporally-continuous traffic pattern.

Another embodiment provides computer-implemented method for generating trajectories from an implicit neural representation (INR) model to predict human mobility in uncertain traffic conditions, the method comprising receiving geocoordinate data representing vehicle motion observations of a traffic pattern; receiving a road network based on the geocoordinate data; training the INR model to learn continuous, latent fields of stochastic traffic properties over space and time based on the geocoordinate data; utilizing the INR model to extract spatio-temporal speed distributions from the geocoordinate data; applying a near-shortest-path, heuristic algorithm, weighted by predictions of the INR model, to produce real-world routing choices for traversing the road network; generating trajectories for transportation between an origin and destination in the road network using the near-shortest-path, heuristic algorithm and the predictions of the INR model, wherein the trajectories reflect non-deterministic and diverse route choices in the road network; and outputting generated trajectories to improve routing choices for a GPS and to provide the route choices for selection.

Another embodiment provides a system for generating trajectories from an implicit neural representation (INR) model to predict human mobility in uncertain traffic conditions, the system comprising memory for storing geocoordinate data representing vehicle motion observations of a traffic pattern; and a processor for receiving a road network based on the geocoordinate data; training the INR model to learn continuous, latent fields of stochastic traffic properties over space and time based on the geocoordinate data; utilizing the INR model to extract spatio-temporal speed distributions from the geocoordinate data; applying a near-shortest-path, heuristic algorithm, weighted by predictions of the INR model, to produce real-world routing choices for traversing the road network; generating trajectories for transportation between an origin and destination in the road network using the near-shortest-path, heuristic algorithm and the predictions of the INR model, wherein the trajectories reflect non-deterministic and diverse route choices in the road network; and outputting generated trajectories to improve routing choices for a GPS and to provide the route choices for selection.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 7A is a graphical illustration showing examples in Porto of optimal and near-optimal paths, according to an embodiment herein;

FIG. 7B is a graphical illustration showing examples in Rome of optimal and near-optimal paths, according to an embodiment herein;

FIG. 8A is a graphical illustration showing a first example in Porto of possible anomalies, according to an embodiment herein;

FIG. 8B is a graphical illustration showing a first example in Porto of possible anomalies, according to an embodiment herein;

FIG. 8C is a graphical illustration showing a first example in Porto of possible anomalies, according to an embodiment herein;

FIG. 8D is a graphical illustration showing a first example in Porto of possible anomalies, according to an embodiment herein;

FIG. 9 is a flow diagram illustrating a method, according to an embodiment herein.

Figure 1:
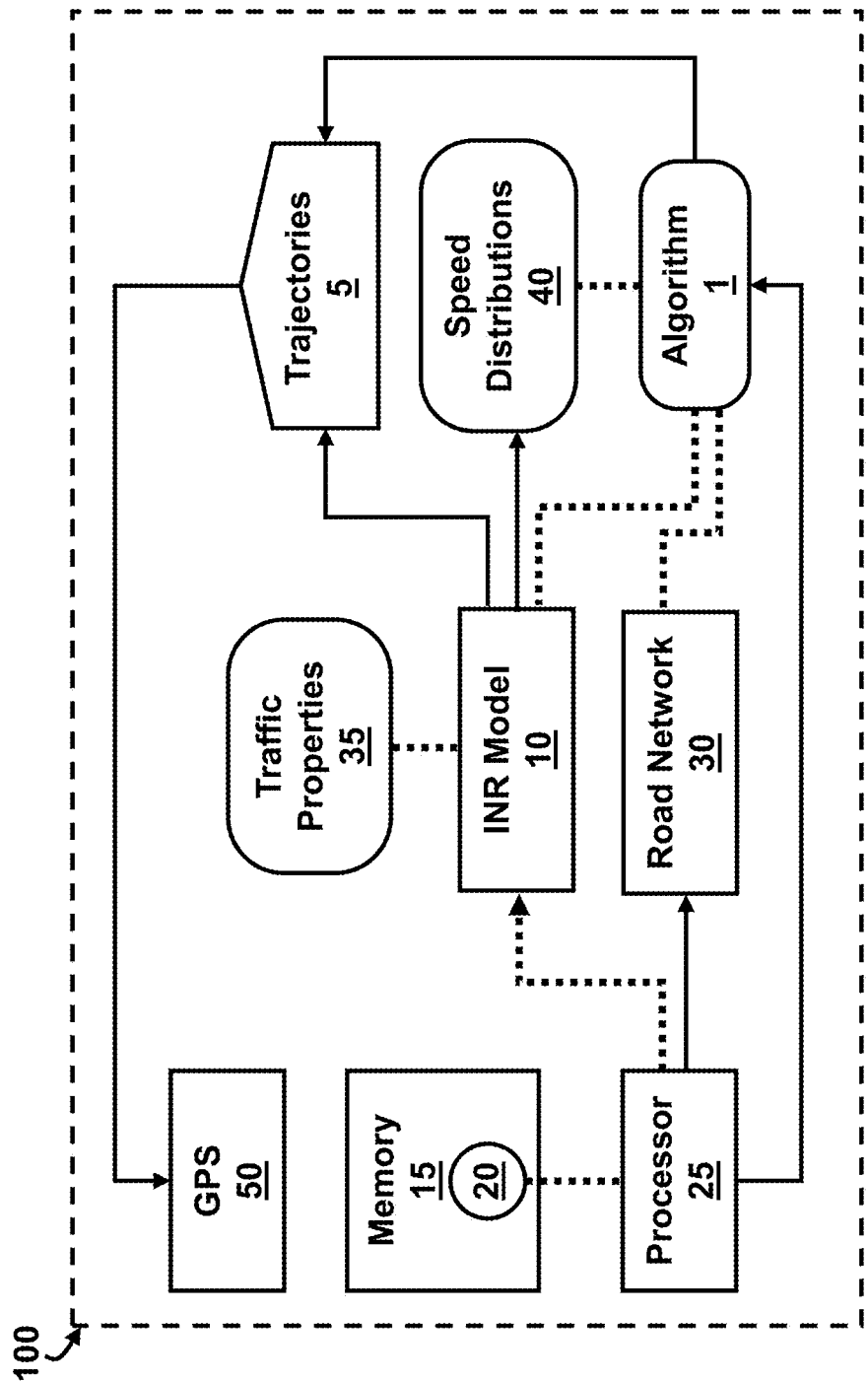
FIG. 1 is a block diagram illustrating a system, according to an embodiment herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. The following description of particular embodiment(s) is merely exemplary in nature and is in no way intended to limit the scope of the invention, its application, or uses, which can, of course, vary.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrates the best mode of practicing the embodiments herein. Upon reading the following description in light of the accompanying drawing figures, those skilled in the art will understand the concepts of the disclosure and will recognize applications of these concepts not particularly addressed herein.

The terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/of" includes any and all combinations of one or more of the associated listed items.

Furthermore, although the terms "final", "first", "second", "upper", "lower", "bottom", "side", "intermediate", "middle", and "top", etc. may be used herein to describe various elements, but these elements should not be limited by these terms. These terms are only used to distinguish one element from another. For example, a first element could be termed an "top" element and, similarly, a second element could be termed a "top" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Modeling human mobility under uncertain conditions and individual preferences remains a difficult and unsolved problem. Data driven deep learning approaches require extensive trajectory data for training, while more traditional methods often assume deterministic conditions or simple minimum-cost paths. The embodiments herein provide an implicit neural representation (INR) to learn continuous, latent fields of stochastic traffic properties over space and time. The embodiments herein provide a technique to successfully impute speeds on a road network with hundreds of thousands of edges from only a few hundred vehicles, then illustrate the quality of these representations on a trajectory generation task. The INR model is used over geocoordinate data to extract spatio-temporal speed distributions from brief fragments of vehicle motion. Moreover, the embodiments herein impute speed distributions in a road network, with spatially and temporally continuous probability densities and a line-graph based path-finding algorithm which efficiently lists near-optimal paths from the latent traffic representation. Without training on trajectory data, the embodiments herein demonstrate the potential for zero-shot detection of anomalous trajectories in real data. A near-shortest-path algorithm weighted by the INR's predictions produces plausible real-world routing choices, showing potential for applications in route planning and anomaly detection. Referring now to the drawings, and more particularly to FIGS. 1 through 10, where similar reference characters denote corresponding features consistently throughout the figures, there are shown preferred embodiments. In the drawings, the size and relative sizes of components, layers, and regions, etc. may be exaggerated for clarity.

FIG. 1 is a block diagram illustrating a system 100 for generating trajectories 5 from an INR model 10 to predict human mobility in uncertain traffic conditions. The INR model 10 may be a neural network according to an embodiment herein. The system 100 comprises memory 15 for storing geocoordinate data 20 representing vehicle motion observations of a traffic pattern, and a processor 25 for receiving a road network 30 based on the geocoordinate data 20. The road network 30 may be arranged as a mapped representation containing information about roads, intersections, and other relevant infrastructure. In an example, the road network 30 may be based on preexisting data constructs. According to an example, the geocoordinate data 20 may be defined as a fixed identification of the latitude and longitude coordinates of a geographic location on Earth expressed in alphanumeric characters. As used herein, "vehicle motion observations" may be defined to include the data relating to the speed and direction of the traffic over a predetermined period of time, according to an example.

The processor 25 is further configured for training the INR model 10 to learn continuous, latent fields of stochastic traffic properties 35 over space and time based on the geocoordinate data 20. The processor 25 is further configured for utilizing the INR model 10 to extract spatio-temporal speed distributions 40 from the geocoordinate data 20. In this regard, the INR model 10 is used to extract information about speed distributions of vehicles over both space and time from the geocoordinate data 20. The processor 25 is further configured for applying a near-shortest-path, heuristic algorithm 1, weighted by predictions of the INR model 10, to produce real-world routing choices for traversing the road network 30. In this regard, the system 100 employs a specific algorithm 1, referred to as a "near-shortest-path heuristic algorithm" to find routes through the road network 30 that are close to the shortest possible paths. This algorithm 1 considers traffic conditions and other factors when making routing decisions. The decisions of the algorithm 1 are influenced by predictions made by the INR model 10, which takes into account the stochastic traffic properties learned during training. The processor 25 is further configured for generating trajectories 5 for transportation between an origin and destination in the road network 30 using the near-shortest-path, heuristic algorithm 1 and the predictions of the INR model 10. The trajectories 5 reflect non-deterministic and diverse route choices in the road network 30. Using the heuristic algorithm 1 and INR model 10 predictions, the system 100 generates multiple possible travel routes (i.e., trajectories 5) between a given origin and destination within the road network 30. These trajectories 5 represent diverse and non-deterministic route choices. The processor 25 is further configured for outputting generated trajectories 5 to improve routing choices for a GPS 50 and to provide the route choices for selection when navigating from an origin to a destination in the road network 30. Accordingly, the system 100 combines geocoordinate data 20, machine learning (i.e., INR model 10), and a routing algorithm 1 to predict and generate multiple route choices for travelers in uncertain traffic conditions, offering them a range of options based on the real-world traffic situations.

In some examples, the processor 25 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a RF switch, antenna tuner, comparator, inverter, or flip-flop, which could include a plurality of transistors and other supporting devices and circuit elements. The modules that are configured with electronic circuits process and/or execute computer logic instructions capable of providing digital and/or analog signals for performing various functions as described herein including controlling the operations of the system 100 and associated components. In some examples, the processor 25 may comprise a central processing unit (CPU) of the system 100. In other examples the processor 25 may be a discrete component independent of other processing components in the system 100. In other examples, the processor 25 may be a semiconductor-based microprocessor, microcontroller, field-programmable gate array (FPGA), hardware engine, hardware pipeline, and/or other hardware-enabled device suitable for receiving, processing, operating, and performing various functions for the system 100. The processor 25 may be provided in the system 100, coupled to the system 100, or communicatively linked to the system 100 from a remote networked location, according to various examples.

The system 100 may be embodied as an electronic device according to an example. For example, the system 100 as embodied as an electronic device may comprise any suitable type of communication device capable of transceiving data. In other examples, system 100 as embodied as an electronic device may comprise a computer, all-in-one (AIO) device, laptop, notebook computer, tablet device, mobile phone, smartphone, electronic book reader, appliance, gaming system, electronic toy, web-based server, local area network server, cloud-based server, etc., among other types of electronic devices that communicate with another device wirelessly.

Furthermore, the system 100 may comprise various controllers, switches, processors, and circuits, which may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

Various examples described herein may include both hardware and software elements. The examples that are implemented in software may include firmware, resident software, microcode, etc. Other examples may include a computer program product configured to include a preconfigured set of instructions, which when performed, may result in actions as stated in conjunction with the methods described above. In an example, the preconfigured set of instructions may be stored on a tangible non-transitory computer readable medium or a program storage device containing software code.

FIGS. 2A through 2D, with reference to FIG. 1, illustrates another example of the system 100 for generating trajectories 5 from an INR model 10 to predict human mobility in uncertain traffic conditions. The system 100 comprises an electronic device 201 containing a computer-readable storage medium 205, and a remote communication device 202 communicatively linked to the electronic device 201. In the example of FIGS. 2A through 2D, the electronic device 201 includes the processor 25 and the computer-readable storage medium 205. Processor 25 may include a central processing unit, microprocessors, hardware engines, and/or other hardware devices suitable for retrieval and execution of instructions stored in a computer-readable storage medium 205. Processor 25 may fetch, decode, and execute computer-executable instructions 220 to enable execution of locally-hosted or remotely-hosted applications for controlling action of the electronic device 201. The remotely-hosted applications may be accessible on remotely-located devices; for example, the remote communication device 202. For example, the remote communication device 202 may be a laptop computer, tablet device, smartphone, or notebook computer. As an alternative or in addition to retrieving and executing instructions, processor 25 may include electronic circuits including a number of electronic components for performing the functionality of the computer-executable instructions 220.

The computer-readable storage medium 205 may be any electronic, magnetic, optical, or other physical storage device that stores executable instructions. Thus, the computer-readable storage medium 205 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the computer-readable storage medium 205 may include a non-transitory computer-readable storage medium 205. The computer-readable storage medium 205 may be encoded with executable instructions for enabling execution of remotely-hosted applications accessed on the remote communication device 202. In an example, the processor 25 of the electronic device 201 executes the computer-executable instructions 220 that when executed cause the electronic device 201 to perform computer-executable instructions 230-276.

Figure 2A:
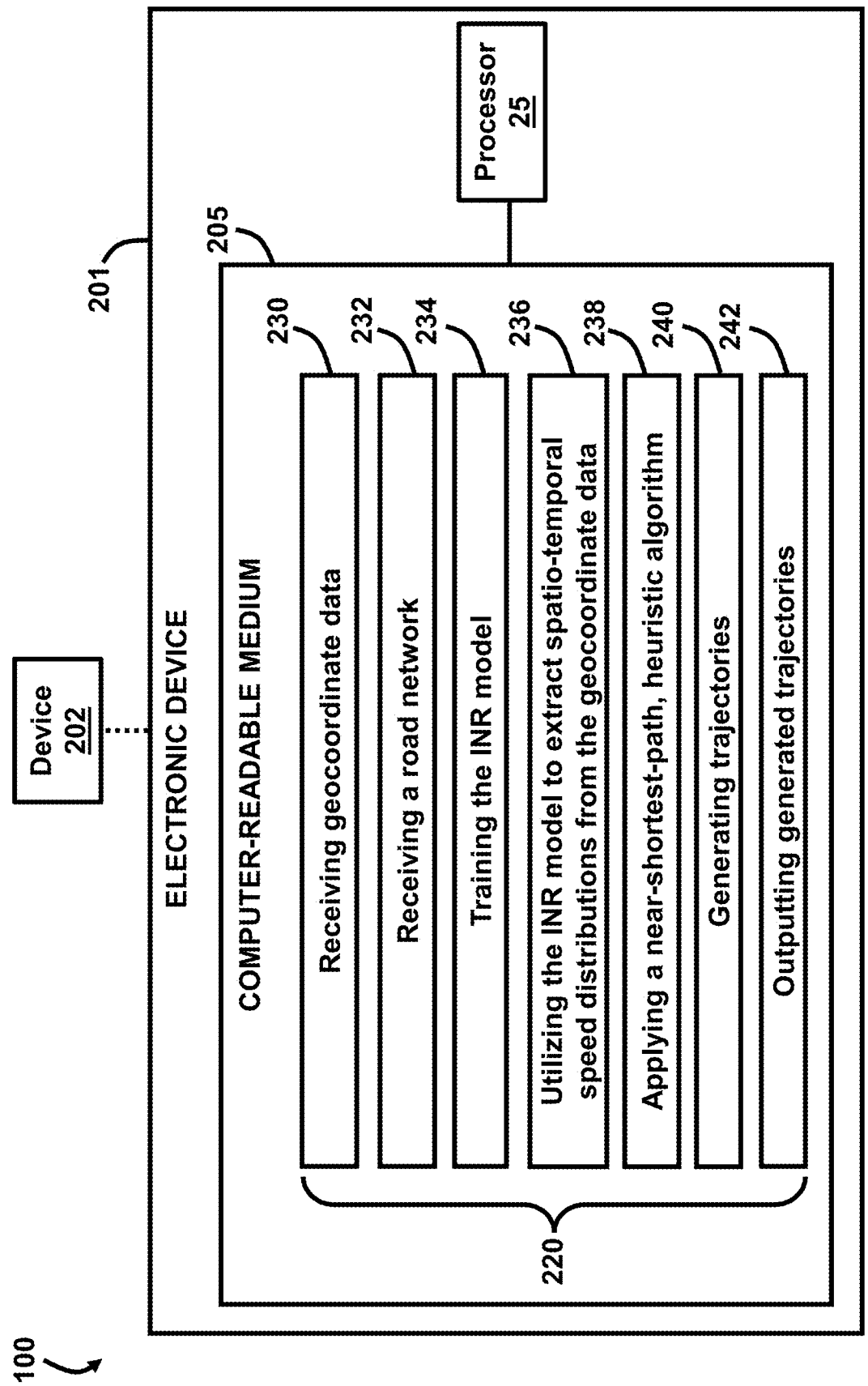
FIG. 2A is a block diagram illustrating a system executing computer-executable instructions, according to an embodiment herein.

As shown in FIG. 2A, the computer-readable medium 205 is configured for storing instructions 220 for generating trajectories 5 from an INR model 10 to predict human mobility in uncertain traffic conditions, the instructions 220 comprising receiving (230) geocoordinate data 20 representing vehicle motion observations of a traffic pattern; receiving (232) a road network 30 based on the geocoordinate data 20; training (234) the INR model 10 to learn continuous, latent fields of stochastic traffic properties 35 over space and time based on the geocoordinate data 20; utilizing (236) the INR model 10 to extract spatio-temporal speed distributions 40 from the geocoordinate data 20; applying (238) a near-shortest-path, heuristic algorithm 1, weighted by predictions of the INR model 10, to produce real-world routing choices for traversing the road network 30; generating (240) trajectories 5 for transportation between an origin and destination in the road network 30 using the near-shortest-path, heuristic algorithm 1 and the predictions of the INR model 10, wherein the trajectories 5 reflect non-deterministic and diverse route choices in the road network 30; and outputting (242) generated trajectories 5 to improve routing choices for a GPS 50 and to provide the route choices for selection.

Figure 2B:
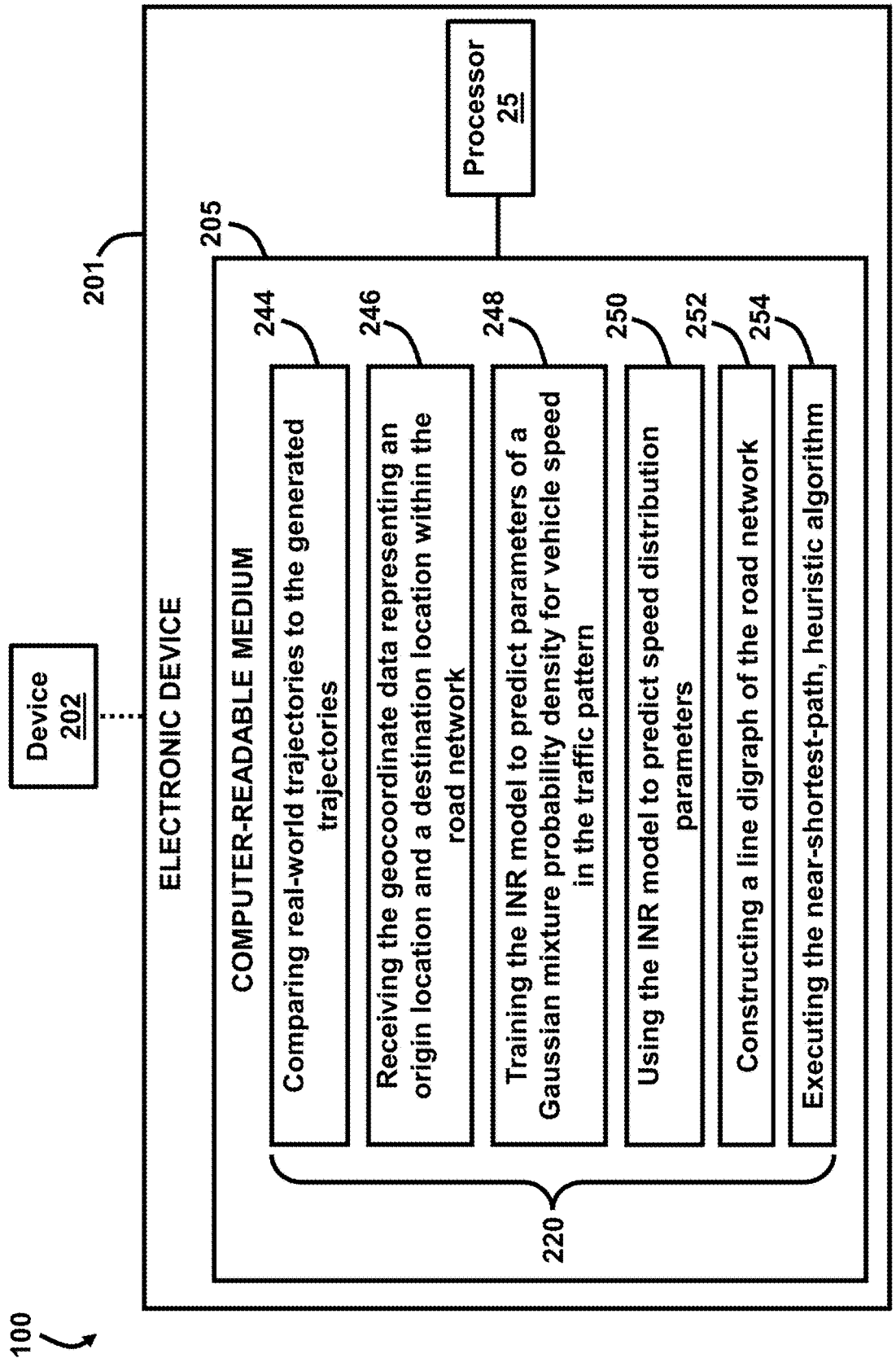
FIG. 2B is a block diagram illustrating a system executing computer-executable instructions, according to an embodiment herein.
Figure 2C:
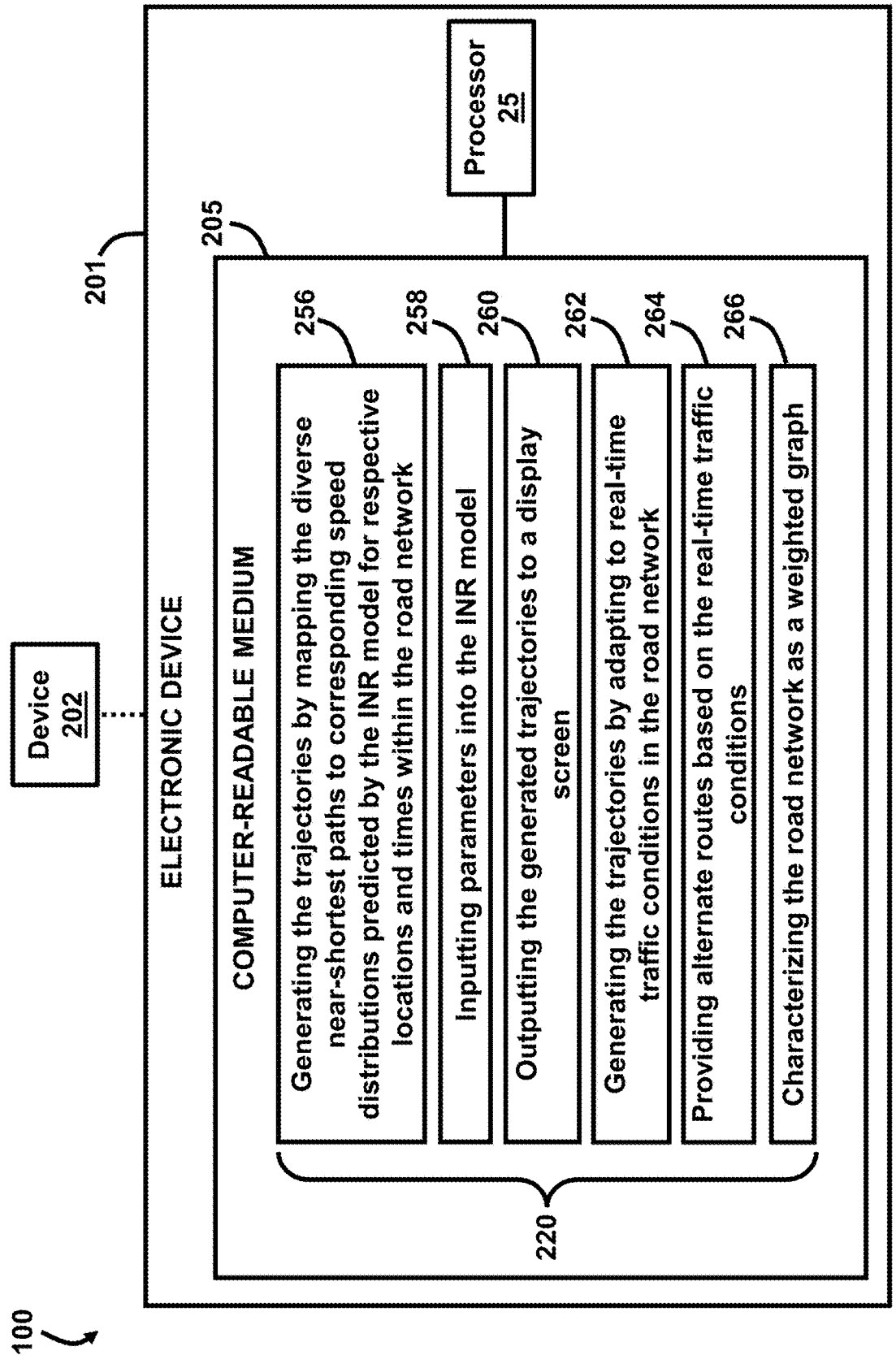
FIG. 2C is a block diagram illustrating a system executing computer-executable instructions, according to an embodiment herein.
Figure 2D:
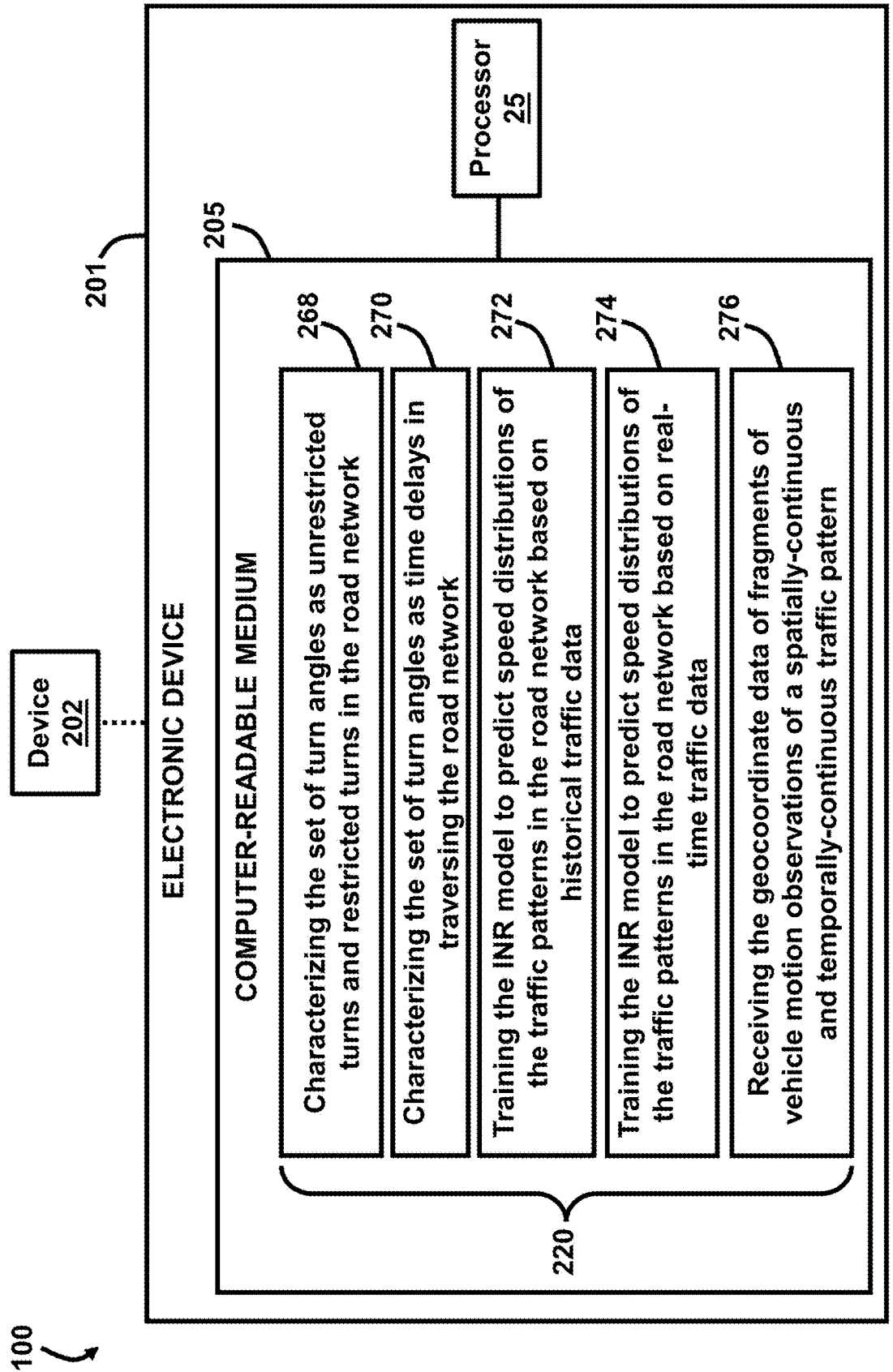
FIG. 2D is a block diagram illustrating a system executing computer-executable instructions, according to an embodiment herein.

As shown in FIGS. 2B through 2D, the various blocks are not necessarily sequential and may be practiced independent from each other and/or in any suitable order. As indicated in FIG. 2B, the instructions 220 may comprise comparing (244) real-world trajectories to the generated trajectories 5 to identify deviations indicative of potential anomalies in real-world transportation behavior. This involves a process where the system 100 compares actual travel routes (real-world trajectories) with the routes it generated (generated trajectories 5) to detect any deviations. These deviations may indicate potential anomalies in the way people are actually traveling in the real world compared to the system's 100 predictions. This is a step for quality control and anomaly detection.

The instructions 220 may comprise receiving (246) the geocoordinate data 20 representing an origin location and a destination location within the road network 30. The system receives geocoordinate data that represents both the starting point (origin location) and the destination (destination location) within the road network 30. This data 20 specifies the geographic coordinates of these locations.

The instructions 220 may comprise training (248) the INR model 10 to predict parameters of a Gaussian mixture probability density for vehicle speed in the traffic pattern. The parameters comprise means and standard deviations for the Gaussian mixture probability density. The system 100 trains the INR model 10 to make predictions about the probability distribution of vehicle speeds in the traffic pattern. Specifically, the INR model 10 predicts parameters of a Gaussian mixture probability density, which includes information like the means and standard deviations of the Gaussian mixture model. This is a statistical model for representing the distribution of vehicle speeds.

The instructions 220 may comprise using (250) the INR model 10 to predict speed distribution parameters for various locations, times, road types, and directions of travel within the road network 30. This means the INR model 10 can estimate how speeds vary based on various factors.

The instructions 220 may comprise constructing (252) a line digraph of the road network 30. The edges of the line digraph correspond to possible turns or transitions between road segments in the road network 30. The system 100 creates a mathematical representation of the road network 30, specifically a line digraph.

The instructions 220 may comprise executing (254) the near-shortest-path, heuristic algorithm 1 to find diverse near-shortest paths from the origin location to the destination location within the line digraph. The near-shortest-path, heuristic algorithm 1 considers costs of paths and pruning (removing) paths exceeding a predetermined cost threshold, and the costs comprise a time expected to traverse a road segment.

As indicated in FIG. 2C, the instructions 220 may comprise generating (256) the trajectories 5 by mapping the diverse near-shortest paths to corresponding speed distributions 40 predicted by the INR model 10 for respective locations and times within the road network 30. This results in a set of possible routes with associated speed profiles.

The instructions 220 may comprise inputting (258) parameters into the INR model 10. The parameters comprise a geocoordinate position in the road network 30, a time of day, a type of road in the road network 30, and a direction of travel in the road network 30. These parameters are used by the INR model 10 to make speed predictions.

The instructions 220 may comprise outputting (260) the generated trajectories 5 to a display screen to provide the route choices for selection. This provides users with a selection of route choices. In an example, the display screen may be part of a vehicle or a communication device such as a smartphone, laptop, handheld, or tablet computer, among other examples. In another example, the display screen may be linked to the GPS 50.

The instructions 220 may comprise generating (262) the trajectories 5 by adapting to real-time traffic conditions in the road network 30. The system 100 can modify the generated trajectories 5 based on current traffic information and provide updated route choices to users.

The instructions 220 may comprise providing (264) alternate routes based on the real-time traffic conditions. As such, in response to real-time traffic data, the system 100 can offer alternative routes to users to help them avoid congestion or other unfavorable conditions in the road network 30.

The instructions 220 may comprise characterizing (266) the road network 30 as a weighted graph comprising a geocoordinate, a road segment in the road network 30, a set of turn angles in the road network 30. These factors may represent possible turns or transitions within the road network 30.

As indicated in FIG. 2D, the instructions 220 may comprise characterizing (268) the set of turn angles as unrestricted turns and restricted turns in the road network 30. Accordingly, the system 100 categorizes turn angles within the road network 30 as either unrestricted (i.e., turns without limitations) or restricted (i.e., turns with specific constraints) to facilitate route planning.

The instructions 220 may comprise characterizing (270) the set of turn angles as time delays in traversing the road network 30, which means they might take longer to traverse, possibly due to traffic congestion or other factors. This helps in identifying better routes in the road network 30.

The instructions 220 may comprise training (272) the INR model 10 to predict speed distributions 40 of the traffic patterns in the road network 30 based on historical traffic data. The predictions may be presented as alternative choices for a user to select, according to an example.

The instructions 220 may comprise training (274) the INR model 10 to predict speed distributions 40 of the traffic patterns in the road network 30 based on real-time traffic data. Accordingly, in addition to historical data, the INR model 10 can also be trained using real-time traffic data, making its predictions more adaptive to current conditions in the road network 30. Again, the predictions may be presented as alternative choices for a user to select, according to an example.

The instructions 220 may comprise receiving (276) the geocoordinate data 20 of fragments of vehicle motion observations of a spatially-continuous and temporally-continuous traffic pattern. Because these observations are both spatially continuous (i.e., covering various geographic areas) and temporally continuous (i.e., capturing data over time), this data 20 allows for accurate modeling and prediction.

The embodiments herein incorporates a lightweight but flexible neural network, an implicit neural representation or INR model 10, to extract deep representations of spatially- and temporally-continuous traffic patterns from point cloud-like vehicle observations.

An implicit neural representation, also called a coordinate-based representation, views a discrete datum as an observation of a continuous, differentiable signal. A convenient example is a 2D color image, often viewed as a H×W×3 tensor (where H and W are height and width, respectively). Alternatively, one may consider a lookup table, where at any given pixel location, there is a color value, $(x,y) \rightarrow (R,G,B)$. As a result, a simple model f could be trained on this image that takes coordinates as input, and predicts colors: $f: \mathbb{R}^2 \rightarrow \mathbb{R}^3$. If f is a neural network, it is referred to as an implicit neural representation. A number of INR applications have been proposed; in almost cases, the main input includes a coordinate position (usually in $\mathbb{R}$, $\mathbb{R}^2$, or $\mathbb{R}^3$) and the output is a scalar or small vector.

INRs may represent 3D objects, via a model $\mathbb{R}^3 \rightarrow \mathbb{R}$ representing whether each position was inside/outside the shape's boundary or how far the coordinate was from it. The idea of parameterizing 2D signals (e.g., images) implicitly via a neural network may be applicable with applications including image generation, spatial super-resolution/upsampling, and compression. Signals outside traditional image and video can also work successfully with INR, such as medical images or audio. One of the most prominent developments from the INR community was the neural radiance field (NeRF), which supposes that a 3D scene could be represented as color and density σ values, conditioned on the viewing angle θ, φ:

$$f:(x,y,z,\theta,\varphi) \rightarrow (R,G,B,\sigma)$$

Using a lightweight model of the scene's physics, points along a camera ray can be traced to a single pixel. Given 2D pictures of the scene from various angles for training, a NeRF can implicitly learn the 3D scene, then generate new 2D images from arbitrary angles.

Although computer graphics and transportation may be two different domains, the intuition of the neural radiance field is used in accordance with the embodiments herein. NeRF leverages lower-dimensional data (2D images) to implicitly model a higher-dimensional latent field (3D radiance) using the physics of that domain (camera rays). Here, low-dimensional movement data is utilized to implicitly model a 2D "field" of traffic properties 35, in order to generate new trajectories using the "physics" of human mobility (near-shortest paths).

Grounded in the challenges of both generative deep learning and simulation, the embodiments herein provide a middle ground for generating human mobility data. The technique provided by the embodiments herein learn from only brief, possibly intermittent observations while mirroring the predictive power of neural networks trained on massive trajectory datasets. Because only anonymous, instantaneous fragments of motion are observed by the model 10, one can ensure sensitive origins and destinations (e.g., homes, workplaces, schools) are protected. Because the model 10 receives individual movements rather than aggregated speed or vehicle counts, one can estimate the full spatio-temporal speed distributions 40 of traffic flow throughout the urban environment, with all their variance and uncertainties. For an individual, both external factors (stochastic samples from possible traffic distributions) and internal preferences (a selection from shortest-cost paths, conditioned on current traffic) can affect their final, nondeterministic route choice. Additionally, the embodiments herein have applications for microsimulation and anomaly detection.

Stochastic mobility conditions. Most related works assume that the speeds and traffic within a road network 30 have nonrandom values. However, some works represent the edge weights of a road network 30 with a discrete distribution over travel speed (in the form of histograms on each edge). Other works built upon this approach by introducing temporal correlations between consecutive time intervals. Another interesting application employs stochastic terms in a least-cost path algorithm 1 to account for uncertainty about human mobility in the far past, supporting archaeological investigation of hunter-gatherer societies in Patagonia. The embodiments herein also model stochastic speed distributions; however, the distributions are continuous densities (from learned Gaussian mixtures) and the INR model 10 is continuous over space and time. In fact, the INR can be queried at any arbitrary space-time point, even multiple points within a single road segment, and at road-time combinations never observed in training.

Alternative shortest paths. The problem of finding a network's k shortest paths is a well-studied one. However, these paths often overlap to a significant degree. As a result, in the context of transportation modeling, significant effort has gone into finding diverse paths, with the intuition that individuals wish to choose between a few distinct options rather than highly similar ones. According to the embodiments herein, controlling the exact number of near-optimal paths k is less desirable than enumerating all likely paths with similar cost to the minimum path (though choosing k could be easily achieved by post-processing with a clustering algorithm). Moreover, the embodiments herein demonstrate possible uses of these "spaghetti plots".

Problem Definition

Point dataset. Let $x_i=(\phi_i, \lambda_i, t_i)$ be an observed latitude-longitude pair $\phi, \lambda$ and its timestamp t. From observing two successive points $x_{i-1}$ and $x_i$, one can straightforwardly calculate the speed s and direction of travel $\theta$. From this, the dataset D is defined to be the set of observed data-tuples:

$$d_i = (\phi_i, \lambda_i, t_i, s_i, \theta_i) \tag{1}$$

Road Network:

Graph. The road network 30 is a directed graph G=(V, E). G will become a weighted graph, whose weights are further described below.

Vertex. Let V be the set of vertices in G. Each v∈V represents a geocoordinate and has attributes latitude $\phi$ and longitude $\lambda$. This point can also be represented with UTM coordinates x,y.

Edge. Let E be the set of edges in G. Each e∈E represents a straight-line road segment and is an ordered pair of vertices: $e=(v_1, v_2)$. Each e also has a length (calculated from the geodesic distance between $e_1$ and $e_2$) and an angle describing its direction (e.g., north, east, south, west).

Turn. Further, the set of turns T are defined. Each i∈T is a directed path with two edges (or equivalently, three vertices). Informally, $\tau = (e_1, e_2) = ((v_1, v_2), (v_2, v_3))$. Each turn has a turn angle $\omega$ from its road segments' directions. Despite the name, a "turn" could be nearly straight ($\omega \approx 0$).

Some turns may be restricted. For example, an intersection might prohibit left turns (so $e_1$ is legal to traverse, $e_2$ is legal to traverse, but the sequence . . . , $e_1, e_2, . . .$ cannot appear in any path). Turns also slow down traffic, affecting the expected travel time, which is further described below.

Trajectory generation problem. Given the road network G, an origin a∈V, and a destination b∈V, the task is to find:

$$X = x_1, \ldots, x_n \tag{2}$$

$$\text{such that } x_1 = \phi(a), \lambda(a) \tag{3}$$

$$x_n = \phi(b), \lambda(b) \tag{4}$$

for some integer n≥1. Recall that each $x_i$ contains a latitude $\phi$, longitude $\lambda$, and time t; X can be generated with or without a regular sampling interval $\Delta t$.

Suppose that, from the road network G, a suitable directed path P=a, . . . , b can be found. If the speed can be accurately predicted for any latitude and longitude:

$$f: \phi, \lambda \rightarrow s \tag{5}$$

then converting from a graph path P to coordinates X becomes trivial: the speed s, direction $\theta$ (from the road network), and a sampling interval $\Delta t$ of are provided. Additional metadata, such as time t, can improve the prediction. The model for f is further described below.

Although trajectories are not observed directly for training, the results should mimic plausible transportation behavior. For example, though P is not necessarily a simple path by definition (without repeat vertices), it often will be. P need not be the minimum-cost path but nonetheless will often have a relatively low cost.

Implicit Neural Representations.

Basic structure. As alluded to above, an INR is a neural network f mapping coordinate values (and possibly additional metadata) to a scalar or vector output. In practice, f is typically a multilayer perceptron (MLP), often a somewhat deep one, with nonpolynomial activation functions on its hidden layers. It is assumed that the mapping from position x,y to speed s can be parameterized as a 8-layer MLP with ReLU activation and hidden layers of 256 neurons. The inputs to the model f are:

(1) Position. UTM coordinates x,y are each passed through a "positional encoding" of sinusoids with exponentially-varying frequency to improve the network's modeling of fine-grained spatial detail.

(2) Time. The time-of-day (real valued, 0 to 24) is passed through a similar positional encoding and model the day of week as a categorical token. For Porto, which contains a full year of data (rather than a month), the time of year is also provided through a positional encoding.

(3) Road types. This information is extracted from OpenStreetMap® as further described below. The road types in some locations may be ambiguous, e.g., due to noise or at intersections. Therefore, the road types of all road segments within a small radius are provided as a binary (though not necessarily one-hot) vector r.

(4) Direction of travel. Here, sin 0, cos 0 are provided as additional model inputs to account for directional variation in travel speed. Examples include differences in directional traffic flow due to rush hour, or differing rules at an intersection (e.g., where one direction must yield, but not the other).

Because each dataset has only a few hundred vehicles (which may not all be active at all times), and far more road segments, the vast majority of location-time pairs are never observed in the training data. The model f must therefore perform a significant amount of imputation during inference.

The above model f would be sufficient to provide a single point estimate of speed for any location (with provided metadata, such as time t). In many cases, however, this would be inadequate. Most locations have a normal variation in traffic speed depending on individual behavior and road conditions. Other speeds are best randomly drawn from a multimodal distribution (e.g., a stoplight allows full-speed traffic sometimes, and sometimes forces a slowdown or stop). To accommodate this stochastic variation, the INR is extended to produce the parameters of a Gaussian mixture probability density rather than a scalar speed estimate.

Gaussian mixture INR. Two additional parameters are introduced to the INR, $\mu$ and $\sigma$, trained alongside the remaining parameters via backpropagation. Each $\mu_i$, $\sigma_i$ parameterizes the mean and standard deviation of a univariate Gaussian distribution of speed, $$p_N(s; \mu_i, \sigma_i) = \frac{1}{\sigma_i \sqrt{2\pi}} \exp\left(-\frac{(s-\mu_i)^2}{2\sigma_i^2}\right) \quad (6)$$

Rather than output the estimated speed directly, the network is parameterized to predict the mixture weights m. The final model is:

$$f: x, y, t, r, \theta \rightarrow m \quad (7)$$

that is, m is predicted from UTM position, time, road types, and direction of travel. A softmax activation ensures that m sums to 1. For a given true speed observation s, the probability density of the mixture can be evaluated and the likelihood of the true observation can be maximized. This is equivalent to minimizing the negative loglikelihood (NLL). Combining the NLL and density, the training loss is:

$$\mathcal{L}(s) = -\log p(s) \quad (8)$$

$$= -\log \Sigma_i m_i p_N(s; \mu_i, \sigma_i) \quad (9)$$

Figure 3:
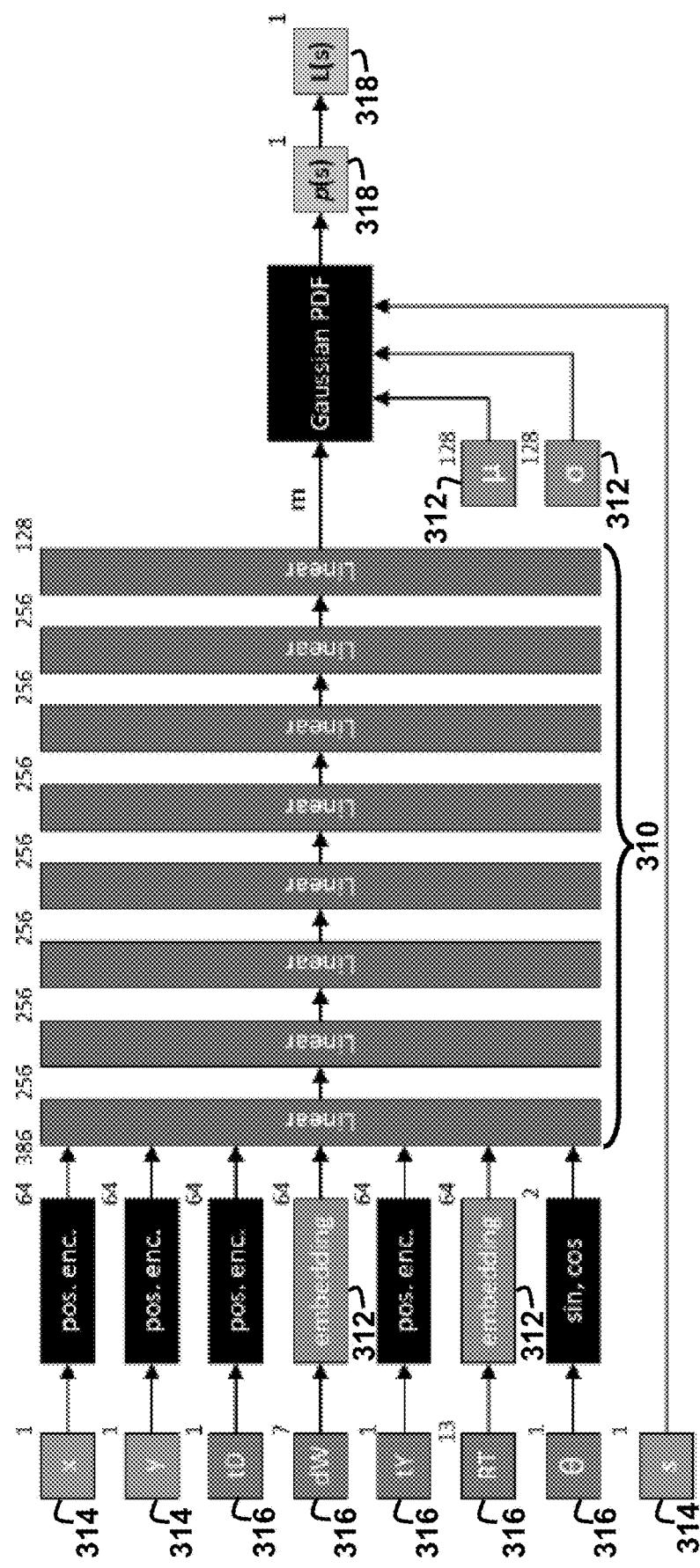
FIG. 3 is a graphical illustration of the full model architecture for the year-long Porto dataset, according to an embodiment herein.

The full model f is shown in FIG. 3, with reference to FIGS. 1 through 2D. FIG. 3 shows the full model f architecture for the year-long Porto dataset. The model for the month-long Rome dataset is nearly the same, but excludes time-of-year. The model f predicts the mixing coefficients m of a Gaussian mixture model from the UTM coordinates x, y and associated metadata. Also shown are the learned layers 310, the learned parameters 312, inputs 314, 316, and outputs 318. The abbreviations are indicated as: tD, time of day; dW, day of week; tY, time of year; RT, road types, PDF, probability density function.

Inferring the Weighted Road Network.

Road segment costs. Once the model f described above is adequately trained, determining the weights of the road network graph G is next. The cost C of a road segment is the time expected to traverse it, the quotient of length and speed:

$$C_G(e;s) = l(e)/s \quad (10)$$

A random sample of C is constructed on each road segment by sampling from the trained model along the road segment. Then, the cost of a particular road segment can be stochastically estimated, or a particular level of traffic can be simulated globally by using this sample to numerically approximate percentiles of the Gaussian mixture density. For example, a "normal" traffic pattern could be estimated by taking the 50th percentile (median) of each road segment.

For a directed graph G, the line digraph L(G) is a second directed graph constructed as follows:

(1) For every edge e in G, make a vertex in L(G).
(2) For every pair of edges $e_1$, $e_2$, make an edge in L(G) if $e_1$'s second vertex is $e_2$'s first. In other words, $e_1$, $e_2$ is a directed path with two edges and three vertices.

Figure 4B:
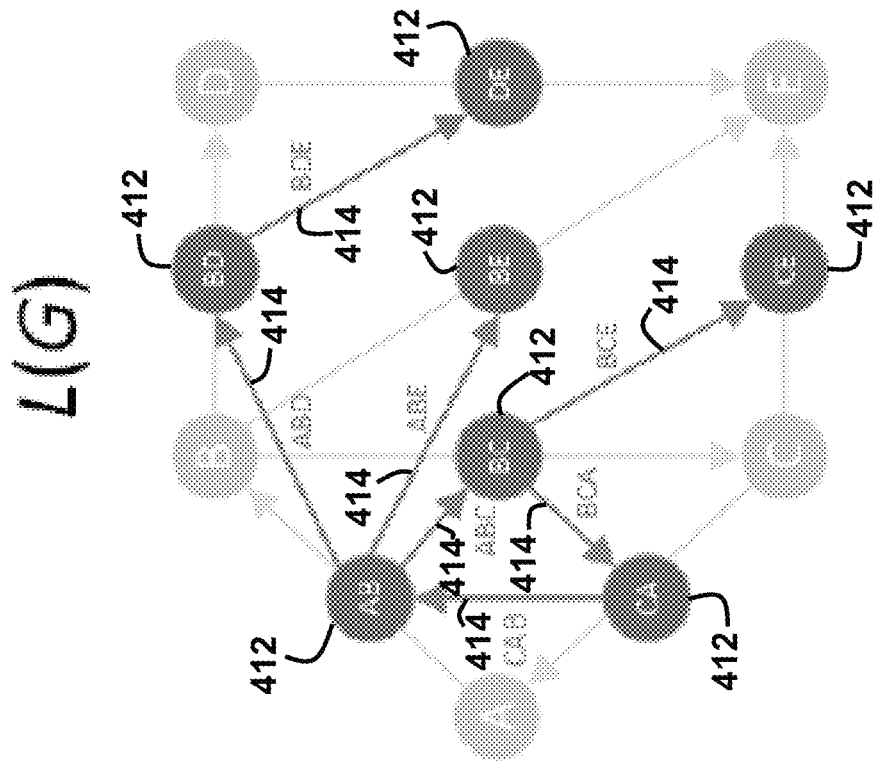
FIG. 4B is a graphical illustration showing an associated line digraph L(G) of the digraph G of FIG. 4A, according to an embodiment herein.
Figure 4A:
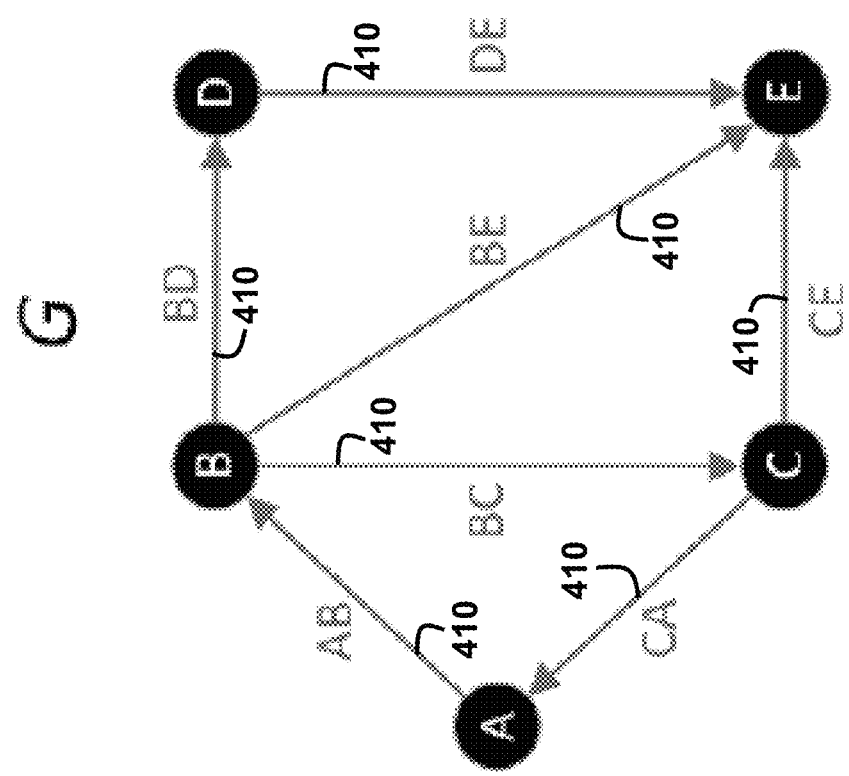
FIG. 4A is a graphical illustration showing a notational example of a diagraph G, according to an embodiment herein.

FIGS. 4A and 4B, with reference to FIGS. 1 through 3, provide an illustrated notional example of a digraph G (FIG. 4A) and its associated line digraph L(G) (FIG. 4B). Each edge 410 in G becomes a vertex 412 in L(G); each path of two edges in G becomes an edge 414 in L(G). Line digraphs are a natural generalization of the more well-known line graphs, which are undirected. Conveniently, an edge 410 in L(G) matches the concept of "turns" which is defined above. As a result, the vertices 412 of L(G) are referred to as e∈E (because they are the same as G's edges 410) and the edges 414 of L(G) as r∈T.

Line digraph. After constructing L(G), turn restrictions can be enforced by pruning its edges. If a particular turn $\tau = (e_1, e_2)$ is prohibited (e.g., no U-turn), the corresponding edge $\tau$ is deleted. Conversely, if restrictions require a turn (e.g., right turn only), all other turns $\{(e_1, e') | e' \neq e_2\}$ are removed. Equivalently, these turns may be given as an infinite cost.

The construction of the line digraph has a second vital purpose. One limitation of modeling only speed is that the model is naïve to delays due to turning. Consider a left turn which requires a vehicle to stop and yield. If the model is allowed to predict speeds of zero, then the edge cost $C_G$ (Equation (10)) goes to infinity. Conversely, if the turns are ignored, there will be no added cost for generating trajectories with indirect, meandering paths with frequent stops.

As a result, for a turn $\tau = (e_1, e_2)$, the following weight for L(G) is defined:

$$C_L(e_1, e_2) = \frac{1}{2}(C_G(e_1) + C_G(e_2)) + C_T(e_1, e_2) \quad (11)$$

The line graph cost $C_L$ is the sum of (i) the average cost $C_G$ of its two road segments and (ii) a parameter $C_T$ referred to as the turn cost. Also included are turn costs for right turns, left turns, and U-turns, determined by the turn angle $\omega$ defined previously. If the angle $\omega$ is small, i.e., the "turn" is straight, no cost is added. To find a single optimal path, any shortest-path algorithm (e.g., Dijkstra's) can find a path through L(G) which minimizes the total $C_L$. An efficient algorithm 1 to find near-optimal paths through L(G) is further described below.

Diverse Near-Shortest Paths.

Next, an algorithm 1 over the line digraph L(G) is described, which enumerates realistic paths given an origin a and destination b. The efficiency of the algorithm 1 is paramount. An algorithm like Dijkstra's is often implemented as $O(V^2)$; since the line digraph L(G) is used, which has a vertex for every edge in G, each execution of Dijkstra's algorithm becomes $O(E^2)$ instead. As a result, a heuristic is described which keeps the number of shortest-path searches to a minimum. The precise values of V and E are provided in Table 1, which uses an expansive, dense, richly-detailed road network 30, including both major highways and small side-streets, in the urban, suburban, and rural environments surrounding both cities.

TABLE 1

Size of digraph G and the corresponding line digraph L(G) for each road network.

|  | Porto | | Rome | |
| --- | --- | --- | --- | --- |
|  | Vertices | Edges | Vertices | Edges |
| G | 150,397 | 267,163 | 506,664 | 857,346 |
| L(G) | 267,163 | 535,161 | 857,346 | 1,632,244 |

A commented pseudocode implementation for the diverse near-shortest paths Algorithm 1 is provided in the Appendix below.

Intuition.

A simple approach to introducing diverse paths is to add detours: additional vertices v such that the path a→b is forced to divert through v. In practice, this involves finding the shortest paths a→v and v→b, then concatenating them. However, v may be so distant from the original a and b that the cost a→v→b is far too high, leading to a discarded candidate path and wasted computation. The heuristic provided by the embodiments herein uses the intermediate steps of Dijkstra's algorithm to significantly narrow the search for reasonable v.

The basic intuition of the algorithm 1 is as follows: suppose one wants to find diverse paths from a to b in the original directed graph G. Using a priority queue Q and beginning with the origin a, at each iteration, the vertex v∈Q is considered with minimum distance to a. When b is eventually visited, the minimum cost path from a→b is achieved; however, one also knows all nodes already visited the minimum cost from a→v.

Suppose the cost of path a→b is C. The set of visited nodes $\xi_a \subset V$ is given such that for all $v \in \xi_a$, the cost of path a→v must be less than or equal to C. Suppose Dijkstra's is run in reverse from b to a. The set of nodes 5b is given such that each path v→b is also bounded by C. So, for any node v in both (a and b, the path a→v→b has at most 2C. If all costs are stored in an efficient manner, then the cost of a→v→b can be quickly checked by adding the costs of its two parts. If the cost is low enough, the path can be returned with minimal added computation (since the min-paths a→v and v→b are already known).

Algorithm 1 adapts this heuristic to the line digraph L(G): now, Dijkstra's is run between directed road segments e F E, not individual vertices. The algorithm 1 iterates over the out-edges of a and the in-edges of b. In practice, most road segments have in-degree/out-degree 1 (one-way road) or 2 (two-way road). As a result, the additional iteration rarely has a noticeable effect on the overall algorithm's runtime.

Algorithm 1 requires a maximum added cost C+. Each path's cost is compared to the minimum one; if the new cost exceeds the minimum by more than C+, it is discarded. Satisfactory results are found by configuring C+ to the either (i) 20% the minimum cost or (ii) 5 minutes, whichever is greater. If only simple paths are desired to be generated, then paths with duplicate vertices that are encountered are dropped in Line 19.

Experimental Results

Datasets and Preprocessing. Two real-world trajectory datasets are employed. For evaluation, full trajectories are used to assess the model's generative performance; however, for training, only individual points are provided to the model. For all datasets, speeds in excess of 150 mph are removed; these almost always appear due to missing data. Further, observations where the vehicles are stopped entirely are removed. Geocoordinates are converted from latitude-longitude pairs to UTM x,y coordinates to facilitate simple distance and speed calculations. Dataset-specific preprocessing is described below.

The Porto dataset tracks 442 taxis over the course of 1 year. Trajectories labeled as missing data or located significantly outside the Porto area are removed. Also, trajectories with fewer than 2 GPS points or more than 1 hour of observations are removed. Finally, discontinuities are smoothed out with a median filter and round trips are removed.

The Rome dataset tracks 320 taxis over the course of 30 days. Trajectories far outside Rome are removed (using the 0.1th and 99.9th percentiles of the GPS data).

For both Rome and Porto, the road network 30 is derived from OpenStreetMap® data. All nodes are acquired and ways are tagged highway with values of motorway, trunk, primary, secondary, tertiary, unclassified, residential, service, or "link" versions of the same. This forms the basic structure of the road network 30 directed graph G described above. Also acquired from OpenStreetMap® is information about turn restrictions (e.g., right turn only, no U-turn, etc.) which was used above.

Implicit Speed Distributions

Figure 5A:
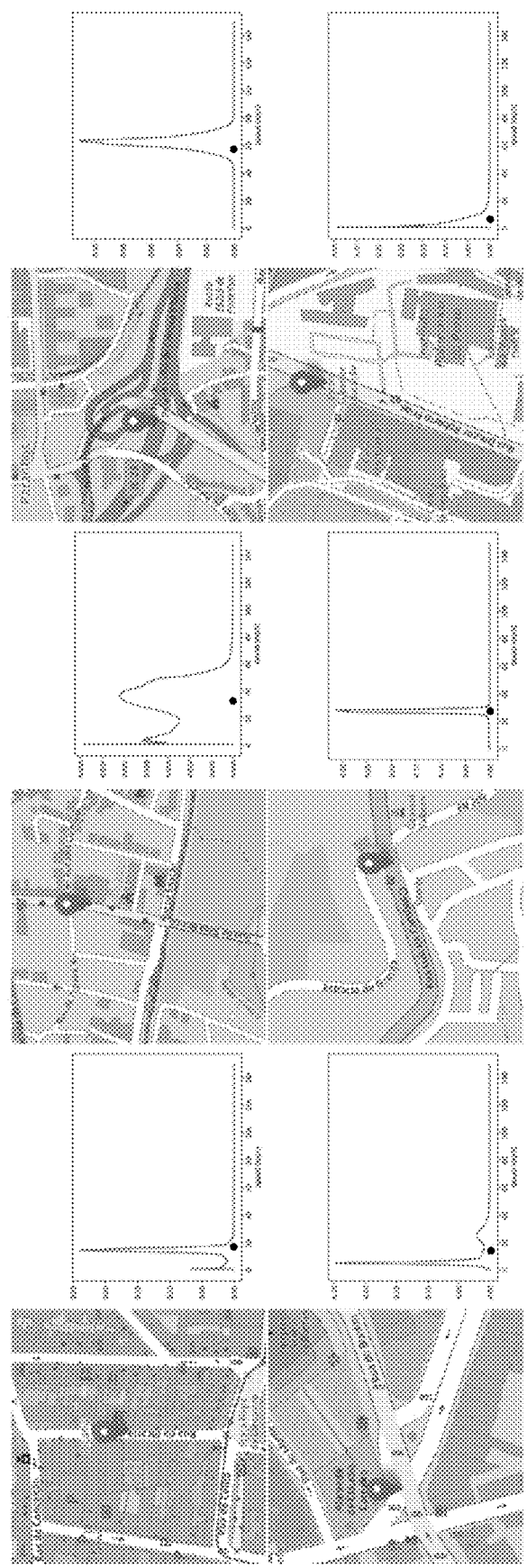
FIG. 5A is a graphical illustration showing examples of locations and their corresponding predicted speed distributions throughout Porto, according to an embodiment herein.
Figure 5B:
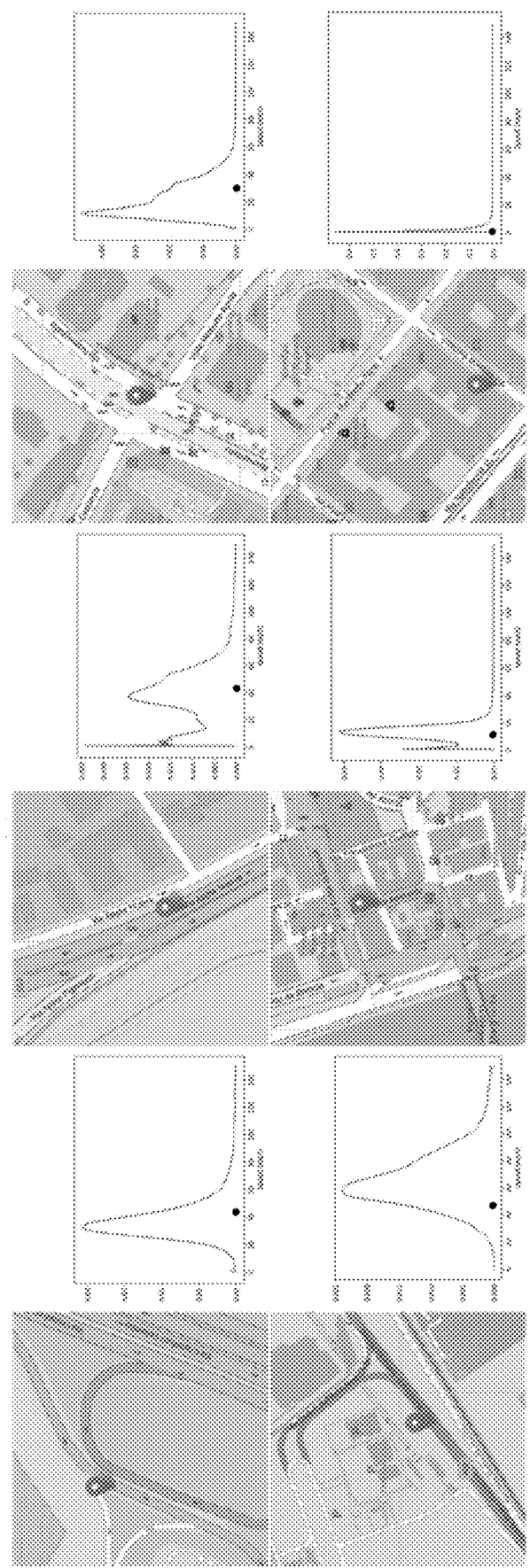
FIG. 5B is a graphical illustration showing examples of locations and their corresponding predicted speed distributions throughout Rome, according to an embodiment herein.

In order to accurately model the unpredictable and stochastic properties of movement within a road network 30, the proposed INR model 10 must be able to produce an incredibly diverse set of univariate speed distributions 40: with low spread, or high variance; with symmetric shape, or significant skew; and with one mode, or several distinct peaks. Methods are described to predict large Gaussian mixtures capable of expressing all the above distributions. In FIGS. 5A and 5B, with reference to FIGS. 1 through 4B, there are shown examples of speed distributions 40 learned by the INR model 10 and their geolocations. It can be observed that the Gaussian mixtures inferred by the model 10 can capture both unimodal and multimodal distributions with varying degrees of skewness, expressing a far wider range of random behavior than could be modeled by a single point estimate alone. Accordingly, the INR model 10 generates a variety of unimodal, multimodal, and skewed distributions. FIG. 5A illustrates the observed geocoordinate on map of Rome and FIG. 5B illustrates the predicted Gaussian mixture probability density function. The dot indicates the actual speed observed for this point.

Figure 6A:
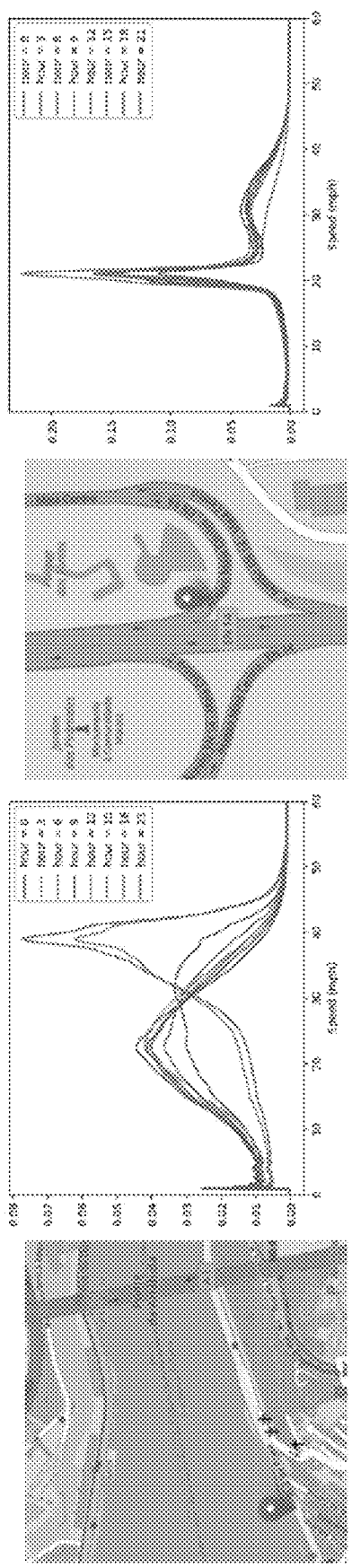
FIG. 6A is a graphical illustration showing examples of Porto locations where the predicted speed distributions change over time, according to an embodiment herein.
Figure 6B:
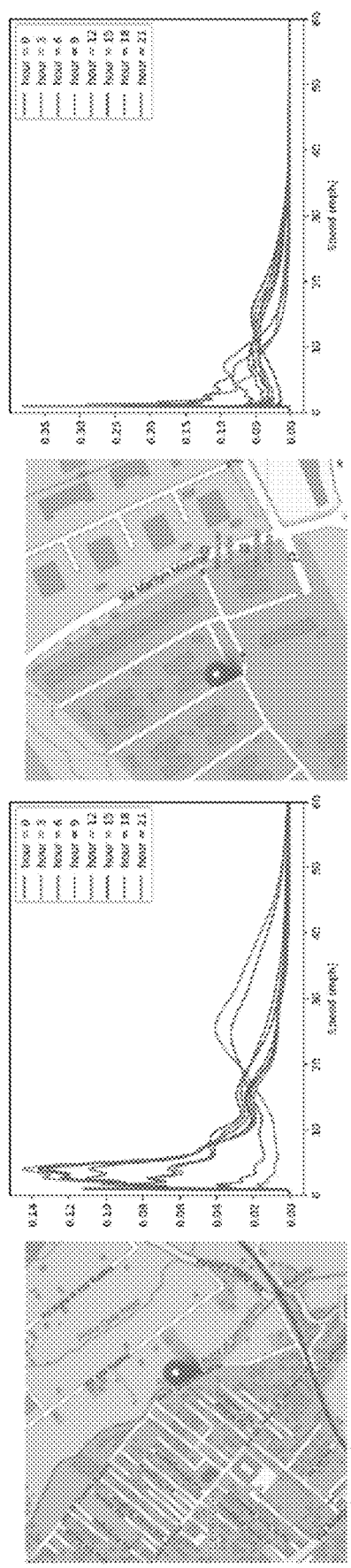
FIG. 6B is a graphical illustration showing examples of Rome locations where the predicted speed distributions change over time, according to an embodiment herein.

To accurately describe traffic patterns evolving over time, these distributions must also be sensitive to the model's additional inputs (e.g., time of day) where needed. Examples of this behavior are shown in FIGS. 6A and 6B, with reference to FIGS. 1 through 5B. The probability density predicted by the model 10 can shift subtly or significantly throughout the hours of the day. FIG. 6A illustrates an example of Porto in which in the left-side graph, one of several locations where a higher probability of faster speed is observed early in the morning, during very low traffic, and in the right-side graph, the chance of traveling at a higher (>25 mph) speed on this highway's on-ramp is significantly lower around 6 pm, near the evening rush hour. FIG. 6B illustrates an example of Rome in which in the left-side graph, daytime speeds here are quite slow, but higher speeds (20-40 mph) can be achieved during the early hours of the morning, and in the right-side graph, conversely, drivers often drive very slowly here at night but can drive at moderate speed during the day.

Generative Capabilities

By combining these speed distributions 40 with the line graph and feasible path algorithm 1 described above, one can efficiently generate numerous plausible routes between two locations. As a result, one can synthesize realistic mobility traces without ever training on trajectory data. FIGS. 7A and 7B, with reference to FIGS. 1 through 6B, show several example origin-destination pairs and the paths computed by algorithm 1 under a normal traffic pattern. By plotting each path on the same map with low opacity, a "spaghetti plot" of frequently and infrequently-selected paths can be visualized. The examples illustrate Porto (FIG. 7A) and Rome (FIG. 7B) and the respective optimal (solid line 701) and near-optimal (dashed line 703) paths. The origin is the "home" icon 704, and the destination is the "flag" icon 705. Plotted are the many generated paths with low opacity, such that more opaque road segments are chosen more often. The system 100 generalizes well to cases where the road network's topology provides few or many plausible routing choices.

Motivating Example: Anomaly Detection

The results in FIGS. 7A and 7B suggest a natural extension to anomaly detection applications. Suppose long-term trajectory data are not available for training, but a small number of trajectories are collected and it is desirable to check for unusual observations. The real trajectories will often coincide with the generated paths, but not always, indicating possible anomalies. FIGS. 8A through 8D, with reference to FIGS. 1 through 7B, show selected examples where all near-optimal paths are generated from algorithm 1, then a real trajectory is compared from the Porto dataset. The origin is the "home" icon 804, and the destination is the "flag" icon 805. In each example, significant portions of the real trajectory (dashed line) do not overlap any of the generated paths (solid line), indicating that parts of the trajectory may be anomalous: the taxi avoids all paths the model 10 considers "normal."

In some examples, the driver simply takes a slower indirect route. FIG. 8A shows a driver avoiding main roads and using slower ones along the riverbank; FIG. 8B shows an unusual eastward route to the airport in the northwest of the city. Some deviations are more subtle: for example, FIG. 8C shows a trajectory using small side streets near the destination, rather than a faster path. FIG. 8D shows a trajectory with a significant detour to a roundabout and plaza far off the main route; this trajectory may be part of a multi-stop trip. With these results, the system 100 exhibits a form of zero-shot unsupervised anomaly detection on trajectory data.

FIG. 9, with reference to FIGS. 1 through 8D, is a flow diagram illustrating a computer-implemented method 300 for generating trajectories 5 from an INR model 10 to predict human mobility in uncertain traffic conditions, the method 300 comprising receiving (302) geocoordinate data 20 representing vehicle motion observations of a traffic pattern; receiving (304) a road network 30 based on the geocoordinate data 20; training (306) the INR model 10 to learn continuous, latent fields of stochastic traffic properties 35 over space and time based on the geocoordinate data 20; utilizing (308) the INR model 10 to extract spatio-temporal speed distributions 40 from the geocoordinate data 20; applying (310) a near-shortest-path, heuristic algorithm 1, weighted by predictions of the INR model 10, to produce real-world routing choices for traversing the road network 30; generating (312) trajectories 5 for transportation between an origin and destination in the road network 30 using the near-shortest-path, heuristic algorithm 1 and the predictions of the INR model 10, wherein the trajectories 5 reflect non-deterministic and diverse route choices in the road network 30; and outputting (314) generated trajectories 5 to improve routing choices for a GPS 50 and to provide the route choices for selection.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown).

The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
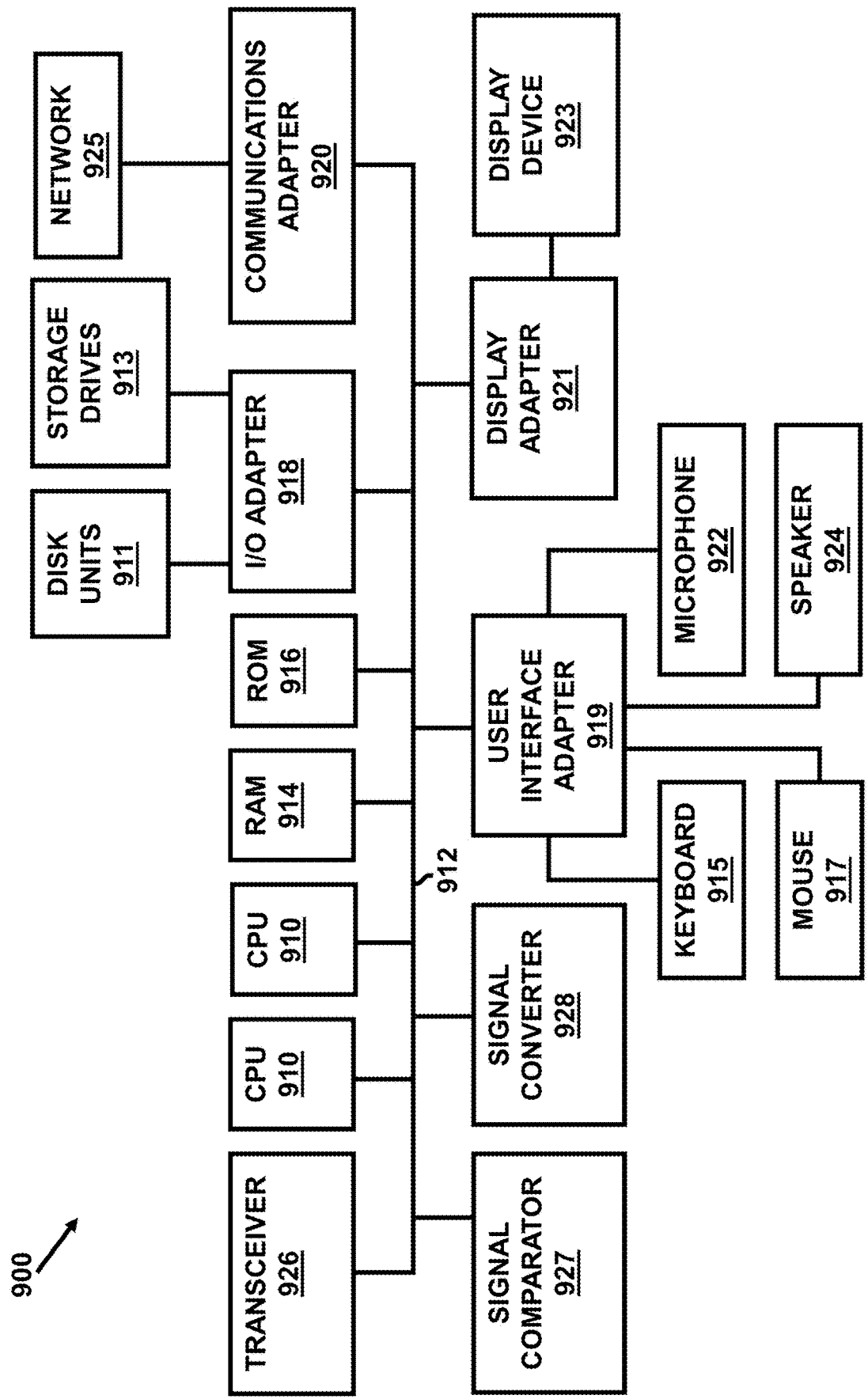
FIG. 10 is a block diagram illustrating a computer system, according to an embodiment herein.

A representative hardware environment for practicing the embodiments herein is depicted in FIG. 10, with reference to FIGS. 1 through 9. This schematic drawing illustrates a hardware configuration of an information handling/computer system 900 in accordance with the embodiments herein. The system 900 comprises at least one processor or central processing unit (CPU) 910. The CPUs 910 are interconnected via system bus 912 to various devices such as a random access memory (RAM) 914, read-only memory (ROM) 916, and an input/output (I/O) adapter 918. The I/O adapter 918 can connect to peripheral devices, such as disk units 911 and tape drives 913, or other program storage devices that are readable by the system. The system 900 can read the inventive instructions on the program storage devices and follow these instructions to execute the methodology of the embodiments herein. The system 900 further includes a user interface adapter 919 that connects a keyboard 915, mouse 917, speaker 924, microphone 922, and/or other user interface devices such as a touch screen device (not shown) to the bus 912 to gather user input. Additionally, a communication adapter 920 connects the bus 912 to a data processing network, and a display adapter 921 connects the bus 912 to a display device 923 which may be embodied as an output device such as a monitor, printer, or transmitter, for example. Further, a transceiver 926, a signal comparator 927, and a signal converter 928 may be connected with the bus 912 for processing, transmission, receipt, comparison, and conversion of electric or electronic signals.

The embodiments herein provide an INR model 10 over geocoordinate data 20 to extract spatio-temporal speed distributions 40 from brief fragments of vehicle motion. The embodiments herein impute speed distributions 40 in a road network 30, with spatially and temporally continuous probability densities and a line-graph-based path-finding algorithm 1 which efficiently lists near-optimal paths from the latent traffic representation. Without training on trajectory data, the system demonstrates potential for zero-shot detection of anomalous trajectories in real data.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

Algorithm 1: Enumerating near-optimal paths

Input: A weighted line digraph L(G), origin vertex a, destination vertex b
Parameter: Maximum added cost $C^+$
Output: Shortest path $P_{min}$, its cost $c_{min}$, a set of near-optimal paths $\mathcal{P}$
    // Cost of the min-cost path
1  $c_{min} \leftarrow \infty$
    // iterate over all out-edges from a and in-edges to b
2  forall $e_a = (v_1, v_2) \in E \mid v_1 = a$ do
3  | forall $e_b = (v_1, v_2) \in E \mid v_2 = b$ do
   | | // Find min-cost to each vertex from a, until b is visited
   | | // $cost_a$ is a look-up table to find the cost
   | | // $prev_a$ is a look-up table for the prior node on the path
4  | | $cost_a, prev_a \leftarrow$ Dijkstra($L_G, e_a, e_b$);
   | | // Perform Dijkstra's backward from b to a
5  | | $cost_b, prev_b \leftarrow$ DijkstraReversed($L_G, e_a, e_b$);
   | | // Is this the best $e_a, e_b$?
6  | | if $cost_a(e_b) < c_{min}$ then
   | | | // Store best cost and path
7  | | | $c_{min} \leftarrow cost_a(e_b)$;
8  | | | $P_{min} \leftarrow$ path($prev_a, e_a, e_b$);
9  | | Store $cost_a, prev_a, cost_b, prev_b$ for later use;
    // Now, $P_{min}$ is the min-cost path from a to b; $c_{min}$ is its cost
10 forall $e_a = (v_1, v_2) \in E \mid v_1 = a$ do
11 | forall $e_b = (v_1, v_2) \in E \mid v_2 = b$ do
12 | | Retrieve $cost_a, prev_a, cost_b, prev_b$ for this $e_a$-$e_b$ pair;
   | | // Find all e visited from $e_a$. By definition, these have cost $C \le c_{min}$ from a
13 | | $\xi_a \leftarrow \{e \mid e \in$ keys($cost_a$)$\}$;
   | | // Find all e visited from $e_b$. By definition, these have cost $C \le c_{min}$ to b
14 | | $\xi_b \leftarrow \{e \mid e \in$ keys($cost_b$)$\}$;
   | | // If an edge e is in both $\xi_a$ and $\xi_b$, then the path $e_a \to e \to e_b$ has cost $C \le 2c_{min}$
   | | // We also already have the shortest paths $e_a \to e$ and $e \to e_b$,
   | | // so we can find the optimal $e_a \to e \to e_b$ without recomputing shortest paths
15 | | $\xi \leftarrow \xi_a \cap \xi_b$;
16 | | forall $e \in \xi$ do
   | | | // Find the cost of path $e_a \to e \to e_b$
17 | | | $C \leftarrow cost_a(e) + cost_b(e)$;
18 | | | if $C \le c_{min} + C^+$ then
   | | | | // Join paths $e_a \to e$ and $e \to e_b$, then store in near-optimal path set $\mathcal{P}$
19 | | | | $P \leftarrow$ join (path($prev_a, e_a, e$), path($prev_b, e, e_b$));
20 | | | | add P to $\mathcal{P}$;
    // Return optimal path, its cost, and a set of near-optimal paths
21 return $P_{min}, c_{min}, \mathcal{P}$;

What is claimed is:

1. A method for generating trajectories, comprising:
receiving fragmented geocoordinate data representing sparse vehicle motion observations;
training an implicit neural representation (INR) model using the fragmented geocoordinate data to learn continuous, latent fields of stochastic traffic properties, wherein training the INR model comprises:
  inputting the fragmented geocoordinate data into a multilayer perceptron with multiple layers and neurons per hidden layer;
  applying a positional encoding to UTM coordinates derived from the geocoordinate data;
  processing temporal data including time-of-day, day-of-week, and time-of-year through a similar positional encoding;
  incorporating road type information as a binary vector representing road types within a predefined radius; and
  outputting parameters of a Gaussian mixture probability density for vehicle speed, wherein the mixture comprises multiple components;
constructing a line digraph of a road network, wherein edges of the line digraph correspond to possible turns or transitions between road segments;
applying a near-shortest-path, heuristic algorithm to the line digraph to determine diverse paths between locations;
generating non-deterministic trajectories by mapping the diverse paths to spatio-temporal speed distributions predicted by the INR model; and
outputting the non-deterministic trajectories to a communication device.

2. The method of claim 1, wherein the parameters comprise:
means and standard deviations for each component of the Gaussian mixture; and
mixture weights for combining the components.

3. The method of claim 1, wherein the INR model extracts spatio-temporal speed distributions by:
querying the trained model with inputs including UTM coordinates, time information, road type, and direction of travel;
generating speed distribution parameters for each queried point;
interpolating between queried points to create continuous speed distribution fields; and
adapting the distributions based on real-time traffic data updates.

4. The method of claim 1, wherein applying the near-shortest-path, heuristic algorithm comprises:
initializing a priority queue with edges connected to the origin location;
iteratively expanding the lowest-cost edge in the queue;
calculating edge costs as a combination of expected travel time and turn penalties;

pruning paths when their cost exceeds a predetermined threshold relative to the minimum cost path;
terminating the search when the destination is reached or the queue is empty; and
backtracking to construct the diverse paths.

5. The method of claim 1, wherein generating the non-deterministic trajectories comprises:
sampling from the predicted speed distributions at intervals along each path;
applying a smoothing function to ensure realistic acceleration and deceleration;
incorporating stochastic elements to model driver behavior variations;
adjusting speeds based on real-time traffic reports and incidents; and
recalculating portions of trajectories when significant traffic changes occur.

6. The method of claim 1, comprising comparing real-world trajectories to the generated non-deterministic trajectories by:
aligning the real-world and generated trajectories in time and space;
calculating point-wise and path-wise divergence metrics;
identifying segments where real-world trajectories deviate significantly from the distribution of generated trajectories;
clustering identified deviations to recognize patterns of anomalous behavior; and
generating alerts for deviations exceeding predetermined thresholds in speed, route choice, or travel time.

7. A system for generating trajectories, comprising:
a memory for storing geocoordinate data representing vehicle motion observations; and
a processor configured to:
train an implicit neural representation (INR) model to learn continuous, latent fields of stochastic traffic properties over space and time based on the geocoordinate data, wherein training the INR model comprises:
inputting the fragmented geocoordinate data into a multilayer perceptron with multiple layers and neurons per hidden layer:
applying a positional encoding to UTM coordinates derived from the geocoordinate data:
processing temporal data including time-of-day, day-of-week, and time-of-year through a similar positional encoding:
incorporating road type information as a binary vector representing road types within a predefined radius; and
outputting parameters of a Gaussian mixture probability density for vehicle speed, wherein the mixture comprises multiple components;
construct a line digraph of a road network, wherein edges of the line digraph correspond to possible turns or transitions between road segments;
execute a near-shortest-path, heuristic algorithm on the line digraph to find diverse near-shortest paths between locations;
generate non-deterministic trajectories by mapping the diverse near-shortest paths to corresponding speed distributions predicted by the INR model; and
output the non-deterministic trajectories to a communication device.

8. The system of claim 7, wherein the INR model predicts parameters of a Gaussian mixture probability density for vehicle speed by:
processing input coordinates through multiple fully-connected layers with non-linear activations; and
outputting a vector of values for a multi-component mixture, representing means, standard deviations, and mixture weights.

9. The system of claim 7, wherein the processor is configured to characterize the road network as a weighted graph by:
extracting road segment geometries and attributes from map data;
computing travel times for each segment based on length and typical speed;
identifying intersections as nodes where multiple segments meet;
calculating turn angles and restrictions at each intersection; and
encoding the resulting graph structure in a format suitable for efficient computation.

10. The system of claim 9, wherein the processor is configured to characterize the set of turn angles as unrestricted turns and restricted turns in the road network by:
classifying turns as unrestricted or restricted based on their angles from straight;
identifying restricted turns based on traffic signs, road markings, and map data;
assigning high costs to prohibited turns in the graph structure; and
updating turn restrictions based on time-of-day regulations and real-time traffic management systems.

11. The system of claim 9, wherein the processor is configured to characterize the set of turn angles as time delays in traversing the road network by:
modeling straight-through movements with minimal delay;
assigning increasing delays for right turns, left turns, and U-turns respectively;
adjusting delays based on the presence of traffic signals and their typical cycle times;
incorporating additional delays for turns crossing major arterials or highways; and
dynamically updating delays based on real-time traffic flow and congestion data.

12. The system of claim 7, wherein the processor is configured to train the INR model to predict speed distributions of traffic patterns based on historical traffic data by:
encoding temporal patterns such as rush hours, weekdays vs. weekends, and seasonal variations;
applying a multi-task learning approach to jointly predict distribution parameters; and
regularizing the model to encourage smooth transitions between adjacent time periods and similar road segments.

13. The system of claim 7, wherein the processor is configured to train the INR model to predict speed distributions of traffic patterns based on real-time traffic data.

14. A non-transitory computer-readable medium storing instructions that, when executed, cause a processor to:
receive geocoordinate data of fragments of vehicle motion observations of a spatially-continuous and temporally-continuous traffic pattern;
train an implicit neural representation (INR) model to learn continuous, latent fields of stochastic traffic properties over space and time based on the geocoordinate data, wherein training the INR model comprises:
  inputting the fragmented geocoordinate data into a multilayer perceptron with multiple layers and neurons per hidden layer;
  applying a positional encoding to UTM coordinates derived from the geocoordinate data:
  processing temporal data including time-of-day, day-of-week, and time-of-year through a similar positional encoding:
  incorporating road type information as a binary vector representing road types within a predefined radius; and
  outputting parameters of a Gaussian mixture probability density for vehicle speed, wherein the mixture comprises multiple components;
construct a line digraph of a road network, wherein edges of the line digraph correspond to possible turns or transitions between road segments;
execute a near-shortest-path, heuristic algorithm on the line digraph to find diverse near-shortest paths between locations;
generate non-deterministic trajectories by mapping the diverse near-shortest paths to corresponding speed distributions predicted by the INR model; and
output the non-deterministic trajectories to a communication device.

15. The medium of claim 14, wherein training the INR model comprises:
  encoding input coordinates using a series of sinusoidal functions with varying frequencies;
  processing the encoded inputs through multiple fully-connected layers;
  applying normalization after hidden layers;
  using non-linear activation functions to introduce non-linearity;
  outputting a vector representing parameters of a Gaussian mixture model with multiple components; and
  applying appropriate activation functions to ensure valid parameter ranges.

16. The medium of claim 14, wherein the instructions cause the processor to input parameters into the INR model, the parameters comprising a geocoordinate position in the road network, a time of day, a type of road in the road network, and a direction of travel in the road network.

17. The medium of claim 14, wherein executing the near-shortest-path, heuristic algorithm comprises considering costs of paths and pruning paths exceeding a predetermined cost threshold, the cost comprising a time expected to traverse a road segment.

18. The medium of claim 14, wherein generating the non-deterministic trajectories comprises:
  selecting a diverse set of near-shortest paths, where the number of paths is dynamically determined based on the ratio of the longest to shortest path cost;
  sampling from the predicted speed distributions at spatial intervals along each path;
  applying a physical motion model to ensure realistic acceleration and deceleration profiles;
  introducing random variations in speed and small path deviations to model different driving styles;
  adjusting trajectories based on real-time traffic conditions, including slowdowns, incidents, and road closures;
  recomputing affected portions of trajectories when significant changes in traffic conditions are detected; and
  pruning generated trajectories that become unrealistic due to changing conditions.

19. The medium of claim 14, wherein the instructions cause the processor to compare real-world trajectories to the generated non-deterministic trajectories to identify deviations indicative of potential anomalies in real-world transportation behavior.

20. The medium of claim 14, wherein the parameters comprise:
  means and standard deviations for each component of the Gaussian mixture; and
  mixture weights for combining the components.

21. The system of claim 7, wherein the parameters comprise:
  means and standard deviations for each component of the Gaussian mixture; and
  mixture weights for combining the components.

* * * * *